US011832348B2

(12) United States Patent
Fan et al.

(10) Patent No.: US 11,832,348 B2
(45) Date of Patent: Nov. 28, 2023

(54) DATA DOWNLOADING METHOD, DATA MANAGEMENT METHOD, AND TERMINAL

(71) Applicant: Huawei Technologies Co., Ltd., Shenzhen (CN)

(72) Inventors: Shunan Fan, Beijing (CN); Xiaobo Yu, Shenzhen (CN); Shuiping Long, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 104 days.

(21) Appl. No.: 17/054,039

(22) PCT Filed: May 10, 2019

(86) PCT No.: PCT/CN2019/086312
§ 371 (c)(1),
(2) Date: Nov. 9, 2020

(87) PCT Pub. No.: WO2019/214697
PCT Pub. Date: Nov. 14, 2019

(65) Prior Publication Data
US 2021/0289344 A1 Sep. 16, 2021

(30) Foreign Application Priority Data

May 11, 2018 (CN) .......................... 201810450843.X

(51) Int. Cl.
*H04W 12/40* (2021.01)
*H04W 8/20* (2009.01)
(Continued)

(52) U.S. Cl.
CPC .............. *H04W 8/205* (2013.01); *G06F 8/61* (2013.01); *H04L 67/303* (2013.01);
(Continued)

(58) Field of Classification Search
CPC ... H04W 8/205; H04W 12/069; H04W 12/35; H04W 12/40; H04W 8/183; H04W 88/06; H04L 67/303
See application file for complete search history.

(56) References Cited

U.S. PATENT DOCUMENTS

| 10,021,557 B1 * | 7/2018 | Mathison .............. H04W 12/35 |
| 2010/0250747 A1 | 9/2010 | Karaoguz et al. |

(Continued)

FOREIGN PATENT DOCUMENTS

| CN | 101902392 A | 12/2010 |
| CN | 103702377 A | 4/2014 |

(Continued)

*Primary Examiner* — Barry W Taylor
(74) *Attorney, Agent, or Firm* — Conley Rose, P.C.

(57) ABSTRACT

Embodiments of this application provide a data downloading and management method and a terminal. The downloading method includes: obtaining, by the terminal, first information pre-provisioned in the terminal, where the first information includes at least one networking profile; obtaining information about to-be-downloaded data, where the information about the to-be-downloaded data includes an identifier of the to-be-downloaded data; determining a first networking profile based on the identifier of the to-be-downloaded data, where the first networking profile is included in the at least one networking profile, and the first networking profile is used by the terminal for networking; sending a first message to a server, where the first message includes the identifier of the information of the to-be-downloaded data; receiving a second message sent by the server, where the second message includes data corresponding to the identifier of the to-be-downloaded data.

20 Claims, 16 Drawing Sheets

(51) Int. Cl.
*H04W 12/069* (2021.01)
*H04W 12/30* (2021.01)
*G06F 8/61* (2018.01)
*H04L 67/303* (2022.01)
*H04W 8/18* (2009.01)
*H04W 88/06* (2009.01)

(52) U.S. Cl.
CPC ......... *H04W 8/183* (2013.01); *H04W 12/069* (2021.01); *H04W 12/35* (2021.01); *H04W 12/40* (2021.01); *H04W 88/06* (2013.01)

(56) References Cited

U.S. PATENT DOCUMENTS

| | | | | |
|---|---|---|---|---|
| 2014/0031012 | A1* | 1/2014 | Park | H04W 12/06 455/411 |
| 2015/0121487 | A1 | 4/2015 | Chastain et al. | |
| 2015/0121495 | A1 | 4/2015 | Gao et al. | |
| 2016/0020803 | A1* | 1/2016 | Cha | H04W 76/10 455/558 |
| 2016/0105540 | A1* | 4/2016 | Kwon | H04N 21/4312 715/744 |
| 2016/0165433 | A1 | 6/2016 | Larignon et al. | |
| 2016/0246611 | A1 | 8/2016 | Li et al. | |
| 2017/0244837 | A1* | 8/2017 | Kim | H04M 3/54 |
| 2018/0123803 | A1* | 5/2018 | Park | H04W 12/04 |
| 2018/0302781 | A1* | 10/2018 | Lee | H04W 12/069 |
| 2019/0074983 | A1* | 3/2019 | Yang | H04L 9/3268 |
| 2019/0208405 | A1* | 7/2019 | Park | H04W 8/20 |
| 2019/0281442 | A1* | 9/2019 | Kim | H04W 48/16 |
| 2019/0349743 | A1* | 11/2019 | Hamblet | H04W 8/04 |
| 2022/0225083 | A1* | 7/2022 | Borisoglebski | H04W 8/183 |
| 2022/0329586 | A1* | 10/2022 | Ståhl | H04W 8/205 |
| 2023/0143696 | A1* | 5/2023 | Canpolat | H04W 48/02 370/338 |

FOREIGN PATENT DOCUMENTS

| | | |
|---|---|---|
| CN | 103731823 A | 4/2014 |
| CN | 105282731 A | 1/2016 |
| CN | 105916134 A | 8/2016 |
| EP | 3032802 A1 | 6/2016 |
| WO | 2015163623 A1 | 10/2015 |

* cited by examiner

DATA DOWNLOADING METHOD, DATA MANAGEMENT METHOD, AND TERMINAL

CROSS-REFERENCE TO RELATED APPLICATIONS

This application is a U.S. National Stage of International Patent Application No. PCT/CN2019/086312 filed on May 10, 2019, which claims priority to Chinese Patent Application No. 201810450843.X filed on May 11, 2018. Both of the aforementioned applications are hereby incorporated by reference in their entireties.

TECHNICAL FIELD

This application relates to the terminal field, and in particular, to a data downloading method, a data management method, and a terminal.

BACKGROUND

An embedded universal integrated circuit card (embedded universal integrated circuit card, eUICC) is a fourth-generation telecommunications smart card. The term eUICC originates from embedded (embedded) UICC. The eUICC may be embedded in a terminal device in a form of a single chip, or may be integrated in a terminal device as a part of another single chip. However, this does not mean that the eUICC must be irremovably embedded in the terminal device. The eUICC may be in a form of a removable card, like a subscriber identity module (subscriber identification module, SIM) card, a micro SIM card, or a nano SIM card. The eUICC may be used to access a network (for example, a 2G/3G/4G/5G network) of an operator after a profile (Profile) provided by the operator is downloaded and installed and the profile is activated.

In the solution of the prior art, in addition to a profile to be downloaded, an application installation package (which may also be referred to as a bundle) carrying the profile is downloaded and installed in a primary platform (Primary Platform) of a terminal. Based on the solution of the prior art, the primary platform may connect to a network by using a provisioning profile (Provisioning Profile, PP), to download a data file. However, in the prior art, a profile of an operator is generally configured in a pre-installed bundle (also referred to as a pre-provisioned bundle). The foregoing profile generally has a networking authority for only some networks of a plurality of operators or a networking authority for only some content in a network of an operator, and is unsuitable for networking of the primary platform to download other bundles. To be specific, the pre-installed bundle cannot provide an initial networking profile for the other bundles and cannot be used to connect to a server to download the other bundles. Consequently, the other bundles cannot be downloaded.

SUMMARY

This application provides a data downloading method, a data management method, and a terminal, to resolve a problem that an application installation package pre-provisioned in a primary platform cannot provide an initial networking profile for other application installation packages and cannot be used to connect to a network to download the other application installation packages.

According to a first aspect, a data downloading method is provided. The downloading method may include:

a terminal obtains first information pre-provisioned in the terminal, where the first information includes at least one networking profile;

the terminal obtains information about to-be-downloaded data, where the information about the to-be-downloaded data includes an identifier of the to-be-downloaded data;

the terminal determines a first networking profile based on the identifier of the to-be-downloaded data, where the first networking profile is included in the at least one networking profile, and the first networking profile is used by the terminal for networking;

the terminal sends a first message to a server, where the first message includes the identifier of the to-be-downloaded data; and the terminal receives a second message sent by the server, where the second message includes data corresponding to the identifier of the to-be-downloaded data.

By using the data downloading method, the at least one networking profile is pre-provisioned in the terminal, and when the terminal downloads the to-be-downloaded data, networking is performed by using the pre-provisioned at least one networking profile, thereby implementing downloading of the to-be-downloaded data. Therefore, a technical problem in the prior art that a networking profile is pre-provisioned in a default bundle and the networking profile is suitable only for downloading APPs in the default bundle and unsuitable for downloading other bundles or APPs in other bundles is avoided.

With reference to the first aspect, in a first possible implementation of the first aspect, that the terminal determines a first networking profile based on the identifier of the to-be-downloaded data includes:

when the at least one networking profile includes a networking profile required for downloading the data, the terminal uses the networking profile as the first networking profile.

With reference to the first aspect, in a second or third possible implementation of the first aspect, the at least one networking profile is pre-provisioned in at least one of an installed application installation package and a primary platform of the terminal.

With reference to the second possible implementation of the first aspect, in a third possible implementation of the first aspect, that the terminal determines a first networking profile based on the identifier of the to-be-downloaded data includes:

When the at least one networking profile is pre-provisioned in the installed application installation package, and the at least one networking profile includes a networking profile required for downloading the data, the terminal uses the networking profile as the first networking profile.

With reference to the second or the third possible implementation of the first aspect, in a fourth possible implementation of the first aspect, that the terminal determines a first networking profile based on the identifier of the to-be-downloaded data includes:

when the at least one networking profile is pre-provisioned in the installed application installation package, and the at least one networking profile does not include the networking profile required for downloading the data, the terminal uses at least one networking profile pre-provisioned in the primary platform as the first networking profile.

With reference to any one of the second to the fourth possible implementations of the first aspect, in a fifth possible implementation of the first aspect, the downloading method may further include:

when the at least one networking profile is not pre-provisioned in the installed application installation package, the terminal uses the at least one networking profile pre-provisioned in the primary platform as the first networking profile.

With reference to the first aspect, or the first to the fifth possible implementations of the first aspect, in a sixth possible implementation of the first aspect, the first information further includes at least one piece of authentication information; the information about the to-be-downloaded data further includes a public key identifier of a certificate issuer CI; and the downloading method further includes:

the terminal determines, from the at least one piece of authentication information, first authentication information corresponding to the public key identifier of the CI, where the first authentication information is used for two-way authentication between the terminal and the server.

With reference to the sixth possible implementation of the first aspect, in a seventh possible implementation of the first aspect, that the terminal determines, from the at least one piece of authentication information, first authentication information corresponding to the public key identifier of the CI includes:

when the at least one piece of authentication information includes authentication information corresponding to the public key identifier of the CI, the terminal uses the authentication information corresponding to the public key identifier of the CI as the first authentication information.

With reference to the sixth or the seventh possible implementation of the first aspect, in an eighth possible implementation of the first aspect, the at least one piece of authentication information is pre-provisioned in at least one of the installed application installation package and the primary platform of the terminal.

With reference to the eighth possible implementation of the first aspect, in a ninth possible implementation of the first aspect, that the terminal determines, from the at least one piece of authentication information, first authentication information corresponding to the public key identifier of the CI includes:

When the at least one piece of authentication information is pre-provisioned in the installed application installation package, and the at least one piece of authentication information includes the authentication information corresponding to the public key identifier of the CI, the terminal uses the authentication information as the first authentication information.

With reference to the eighth or the ninth possible implementation of the first aspect, in a tenth possible implementation of the first aspect, that the terminal determines, from the at least one piece of authentication information, first authentication information corresponding to the public key identifier of the CI includes:

when the at least one piece of authentication information is pre-provisioned in the installed application installation package, and the at least one piece of authentication information does not include the authentication information corresponding to the public key identifier of the CI, the terminal uses the at least one piece of authentication information pre-provisioned in the primary platform as the first authentication information.

With reference to the eighth to the tenth possible implementations of the first aspect, in an eleventh possible implementation of the first aspect, the downloading method further includes:

when the at least one piece of authentication information is not pre-provisioned in the installed application installation package, the terminal uses the at least one piece of authentication information pre-provisioned in the primary platform as the first authentication information.

With reference to the first aspect or any one of the foregoing possible implementations of the first aspect, in a twelfth possible implementation of the first aspect, when the to-be-downloaded data is an application installation package, the identifier of the to-be-downloaded data is an identifier of the application installation package.

With reference to the first aspect or any one of the foregoing possible implementations of the first aspect, in a thirteenth possible implementation of the first aspect, when the to-be-downloaded data is an APP, the identifier of the to-be-downloaded data is an identifier of the APP, and the information about the to-be-downloaded data further includes an identifier of an application installation package of the APP; and that the terminal determines a first networking profile based on the identifier of the to-be-downloaded data includes: when the application installation package corresponding to the identifier of the application installation package of the APP is installed in the terminal, and no available first networking profile exists in the application installation package of the APP, the terminal determines the first networking profile based on the identifier of the to-be-downloaded data.

With reference to any one of the first to the eleventh and the thirteenth possible implementation of the first aspect, in a fourteenth possible implementation of the first aspect, when the to-be-downloaded data is the APP, the identifier of the to-be-downloaded data is the identifier of the APP, and the information about the to-be-downloaded data further includes the identifier of the application installation package of the APP;

when the application installation package of the APP is not installed in the terminal, that the terminal sends a first message to a server includes:

the terminal sends the first message to the server, where the first message includes the identifier of the application installation package of the APP; and that the terminal receives a second message sent by the server, where the second message includes data corresponding to the identifier of the to-be-downloaded data includes:

the terminal receives the second message sent by the server, where the second message includes data corresponding to the identifier of the application installation package of the APP, and installs the data in the primary platform of the terminal;

the terminal sends a third message to the server, where the third message includes the identifier of the APP; and the terminal receives a fourth message sent by the server, where the fourth message includes data corresponding to the identifier of the APP.

With reference to any one of the first to the eleventh and the thirteenth possible implementation of the first aspect, in a fifteenth possible implementation of the first aspect, when the to-be-downloaded data is the APP, the identifier of the to-be-downloaded data is the identifier of the APP, and the information about the to-be-downloaded data further includes the identifier of the application installation package of the APP;

when the application installation package corresponding to the identifier of the application installation package is not installed in the terminal, that the terminal sends a first message to a server includes:

the terminal sends the first message to the server, where the first message includes the identifier of the application installation package of the APP and the identifier of the APP; and that the terminal receives a second message sent by the server, where the second message includes data corresponding to the identifier of the to-be-downloaded data includes:

the terminal receives the second message sent by the server, where the second message includes the application installation package corresponding to the identifier of the application installation package of the APP and the APP corresponding to the identifier of the APP.

With reference to the eleventh possible implementation of the first aspect, in a twelfth possible implementation of the first aspect, after the terminal receives the application installation package downloaded by the server based on the identifier of the to-be-downloaded application installation package, the downloading method further includes:

the terminal installs the data in the application installation package of the to-be-downloaded APP.

According to a second aspect, a data downloading method is provided. The downloading method is applied to a terminal, and the terminal includes a management module. The downloading method includes:

the management module obtains first information pre-provisioned in the terminal, where the first information includes at least one networking profile;

the management module obtains information about to-be-downloaded data, where the information about the to-be-downloaded data includes an identifier of the to-be-downloaded data;

the management module determines a first networking profile based on the identifier of the to-be-downloaded data, where the first networking profile is included in the at least one networking profile, and the first networking profile is used by the terminal for networking;

the management module sends a first message to a server, where the first message includes the identifier of the to-be-downloaded data; and the management module receives a second message sent by the server, where the second message includes data corresponding to the identifier of the to-be-downloaded data.

By using the data downloading method, the at least one networking profile is pre-provisioned in the terminal, and when the management module downloads the to-be-downloaded data, networking is performed by using the pre-provisioned at least one networking profile, thereby implementing downloading of the to-be-downloaded data. Therefore, a technical problem in the prior art that a networking profile is pre-provisioned in a default bundle and the networking profile is suitable only for downloading APPs in the default bundle and unsuitable for downloading other bundles or APPs in other bundles is avoided.

With reference to the second aspect, in a first possible implementation of the second aspect, that the management module determines a first networking profile based on the identifier of the to-be-downloaded data includes:

when the at least one networking profile includes a networking profile required for downloading the data, the management module uses the networking profile as the first networking profile.

With reference to the second aspect, in a second or third possible implementation of the second aspect, at least one networking profile is pre-provisioned in at least one of an installed application installation package and a primary platform of the terminal.

With reference to the second possible implementation of the second aspect, in a third possible implementation of the second aspect, that the management module determines a first networking profile based on the identifier of the to-be-downloaded data includes:

When the at least one networking profile is pre-provisioned in the installed application installation package, and the at least one networking profile includes a networking profile required for downloading the data, the management module uses the networking profile as the first networking profile.

With reference to the second or the third possible implementation of the second aspect, in a fourth possible implementation of the second aspect, that the management module determines a first networking profile based on the identifier of the to-be-downloaded data includes:

when the at least one networking profile is pre-provisioned in the installed application installation package, and the at least one networking profile does not include the networking profile required for downloading the data, the management module uses the at least one networking profile pre-provisioned in the primary platform as the first networking profile.

With reference to any one of the second to the fourth possible implementations of the second aspect, in a fifth possible implementation of the second aspect, the downloading method further includes:

when the at least one networking profile is not pre-provisioned in the installed application installation package, the terminal uses the at least one networking profile pre-provisioned in the primary platform as the first networking profile.

With reference to the second aspect, or the first to the fifth possible implementations of the second aspect, in a sixth possible implementation of the second aspect, the first information further includes at least one piece of authentication information; the information about the to-be-downloaded data further includes a public key identifier of a certificate issuer CI; and the downloading method further includes:

the management module determines, from the at least one piece of authentication information, first authentication information corresponding to the public key identifier of the CI, where the first authentication information is used for two-way authentication between the terminal and the server.

With reference to the sixth possible implementation of the second aspect, in a seventh possible implementation of the second aspect, that the management module determines, from the at least one piece of authentication information, first authentication information corresponding to the public key identifier of the CI includes:

when the at least one piece of authentication information includes authentication information corresponding to the public key identifier of the CI, the terminal uses the authentication information corresponding to the public key identifier of the CI as the first authentication information.

With reference to the sixth or the seventh possible implementation of the second aspect, in an eighth possible implementation of the second aspect, at least one piece of authentication information is pre-provisioned in at least one of the installed application installation package and the primary platform of the terminal.

With reference to the eighth possible implementation of the second aspect, in a ninth possible implementation of the second aspect, that the management module determines, from the at least one piece of authentication information, first authentication information corresponding to the public key identifier of the CI includes:

When the at least one piece of authentication information is pre-provisioned in the installed application installation package, and the at least one piece of authentication information includes the authentication information corresponding to the public key identifier of the CI, the management module uses the authentication information as the first authentication information.

With reference to the eighth or the ninth possible implementation of the second aspect, in a tenth possible implementation of the second aspect, that the management module determines, from the at least one piece of authentication information, first authentication information corresponding to the public key identifier of the CI includes:

when the at least one piece of authentication information is pre-provisioned in the installed application installation package, and the at least one piece of authentication information does not include the authentication information corresponding to the public key identifier of the CI, the management module uses the at least one piece of authentication information pre-provisioned in the primary platform as the first authentication information.

With reference to the eighth to the tenth possible implementations of the second aspect, in an eleventh possible implementation of the second aspect, the downloading method further includes:

when the at least one piece of authentication information is not pre-provisioned in the installed application installation package, the management module uses the at least one piece of authentication information pre-provisioned in the primary platform as the first authentication information.

With reference to the second aspect or any one of the foregoing possible implementations of the second aspect, in a twelfth possible implementation of the second aspect, when the to-be-downloaded data is an application installation package, the identifier of the to-be-downloaded data is an identifier of the application installation package.

With reference to the second aspect or any one of the foregoing possible implementations of the second aspect, in a thirteenth possible implementation of the second aspect, when the to-be-downloaded data is an APP, the identifier of the to-be-downloaded data is an identifier of the APP, and the information about the to-be-downloaded data further includes an identifier of an application installation package of the APP; and that the management module determines a first networking profile based on the identifier of the to-be-downloaded data includes:

when the application installation package corresponding to the identifier of the application installation package of the APP is installed in the terminal, and no available first networking profile exists in the application installation package of the APP, the management module determines the first networking profile based on the identifier of the to-be-downloaded data.

With reference to any one of the first to the eleventh and the thirteenth possible implementation of the second aspect, in a fourteenth possible implementation of the second aspect, when the to-be-downloaded data is the APP, the identifier of the to-be-downloaded data is the identifier of the APP, and the information about the to-be-downloaded data further includes the identifier of the application installation package of the APP;

when the application installation package of the APP is not installed in the terminal, that the management module sends a first message to a server includes:

the management module sends the first message to the server, where the first message includes the identifier of the application installation package of the APP;

that the management module receives a second message sent by the server, where the second message includes data corresponding to the identifier of the to-be-downloaded data, includes:

the management module receives the second message sent by the server, where the second message includes data corresponding to the identifier of the application installation package of the APP, and the management module installs the data in the primary platform of the terminal;

the management module sends a third message to the server, where the third message includes the identifier of the APP; and the management module receives a fourth message sent by the server, where the fourth message includes data corresponding to the identifier of the APP.

With reference to any one of the first to the eleventh and the thirteenth possible implementation of the second aspect, in a fifteenth possible implementation of the second aspect, when the to-be-downloaded data is the APP, the identifier of the to-be-downloaded data is the identifier of the APP, and the information about the to-be-downloaded data further includes the identifier of the application installation package of the APP;

when the application installation package corresponding to the identifier of the application installation package is not installed in the terminal, that the terminal sends a first message to a server includes:

the management module sends the first message to the server, where the first message includes the identifier of the application installation package of the APP and the identifier of the APP; and that the management module receives a second message sent by the server, where the second message includes data corresponding to the identifier of the to-be-downloaded data, includes:

the management module receives the second message sent by the server, where the second message includes the application installation package corresponding to the identifier of the application installation package of the APP and the APP corresponding to the identifier of the APP.

According to a third aspect, a data downloading method is provided. The method is applicable to a secure element, and the secure element is included in a terminal. The downloading method includes:

the secure element sends a preconfigured at least one networking profile to a management module of the terminal, where the at least one networking profile is used by the management module for networking, and obtaining data based on information obtained by the management module about to-be-downloaded data, where the data corresponds to an identifier of the to-be-downloaded data that is included in the information about the to-be-downloaded data;

the secure element receives the data sent by the management module; and the secure element installs the data.

In a possible implementation, the at least one networking profile is pre-provisioned in at least one of an installed application installation package or a primary platform of the secure element.

According to a fourth aspect, a method for managing data in a terminal is provided. The terminal includes a management module. The method may include:

the management module receives an operation instruction, where the operation instruction includes a deletion instruction, a deactivation instruction, or a switch instruction, the operation instruction includes an identifier of a first application installation package or an identifier of a first networking profile, and the operation instruction is used to manage the first application installation package or the first networking profile installed in the terminal;

the management module determines whether a second networking profile used for networking exists in the terminal after the operation instruction is executed; and when the second networking profile used for networking exists in the terminal, the management module executes the operation instruction and activates the second networking profile.

In this solution, the management module determines an operation based on an installation status of the networking profile in the application installation package. In this way, an unintentional user operation that makes networking impossible and further makes it impossible to download an application is avoided, terminal networking is ensured, and user experience is improved.

According to a fifth aspect, a terminal is provided. The terminal includes a module or unit configured to perform the method provided in the first aspect or any possible implementation of the first aspect. By using the data downloading method, at least one networking profile is pre-provisioned in the terminal, and when the terminal downloads to-be-downloaded data, networking is performed by using the pre-provisioned at least one networking profile, thereby implementing downloading of the to-be-downloaded data. Therefore, a technical problem in the prior art that a networking profile is pre-provisioned in a default bundle and the networking profile is suitable only for downloading APPs in the default bundle and unsuitable for downloading other bundles or APPs in other bundles is avoided.

According to a sixth aspect, a management apparatus is provided. The management apparatus is included in a terminal. The management apparatus includes a module or unit configured to perform the method provided in the second aspect or any possible implementation of the second aspect.

By using the data downloading method, at least one networking profile is pre-provisioned in the terminal, and when the management module downloads to-be-downloaded data, networking is performed by using the pre-provisioned at least one networking profile, thereby implementing downloading of the to-be-downloaded data. Therefore, a technical problem in the prior art that a networking profile is pre-provisioned in a default bundle and the networking profile is suitable only for downloading APPs in the default bundle and unsuitable for downloading other bundles or APPs in other bundles is avoided.

According to a seventh aspect, a secure element in a terminal is provided. The secure element includes a module or unit configured to perform the method provided in the third aspect or any possible implementation of the third aspect.

According to an eighth aspect, a management apparatus in a terminal is provided. The management apparatus includes a module or unit configured to perform the method provided in the fourth aspect or any possible implementation of the fourth aspect.

According to a ninth aspect, a terminal is provided. The terminal includes a processor, a memory, a transmitter, and a receiver. The memory, the transmitter, and the memory are connected to the processor. The memory is configured to store an instruction. The processor is configured to invoke the instruction in the memory to perform the method provided in the first aspect or any possible implementation of the first aspect.

According to a tenth aspect, a management apparatus is provided. The management apparatus is included in a terminal. The management apparatus includes a processor, a memory, a transmitter, and a receiver. The memory, the transmitter, and the memory are connected to the processor. The memory is configured to store an instruction. The processor is configured to invoke the instruction in the memory to perform the method provided in the second aspect or any possible implementation of the second aspect.

According to an eleventh aspect, a secure element is provided. The secure element is included in a terminal. The secure element includes a processor, a memory, a transmitter, and a receiver. The memory, the transmitter, and the memory are connected to the processor. The memory is configured to store an instruction. The processor is configured to invoke the instruction in the memory to perform the method provided in the third aspect or any possible implementation of the third aspect.

According to a twelfth aspect, a management apparatus in a terminal is provided. The management apparatus includes a processor, a memory, a transmitter, and a receiver. The memory, the transmitter, and the memory are connected to the processor. The memory is configured to store an instruction. The processor is configured to invoke the instruction in the memory to perform the method provided in the third aspect or any possible implementation of the third aspect.

According to a thirteenth aspect, a communications apparatus is provided. The communications apparatus includes a processor and a memory. The memory is configured to store a program instruction. The processor is configured to execute the program instruction stored in the memory. In this way, the device is enabled to perform the method in the first aspect or any possible implementation of the first aspect, or the device is enabled to perform the method in the second aspect or any possible implementation of the second aspect, the device is enabled to perform the method in the third aspect or any possible implementation of the third aspect, or the device is enabled to perform the method in the fourth aspect or any possible implementation of the fourth aspect.

According to a fourteenth aspect, a computer storage medium is provided. The computer storage medium is configured to store a program. When the program is executed, the method provided in any possible implementation of the first aspect to the fourth aspect is implemented.

According to a fifteenth aspect, a computer program or a computer program product is provided. The computer program or the computer program product includes an instruction. When the instruction is executed, the method provided in any possible implementation of the first aspect to the fourth aspect is implemented.

By using the provided data downloading method, data management method, and terminal, the terminal stores the initial networking profile to negotiate downloading of an application installation package and resolve a problem that after a bundle or profiles of several operators are pre-provisioned in the primary platform, the profiles of the operators are directed to a portal of only one operator or service provider or portals of several specific operators or service providers, which may otherwise make it impossible to download application installation packages of other operators or service providers.

DESCRIPTION OF EMBODIMENTS

Figure 1:
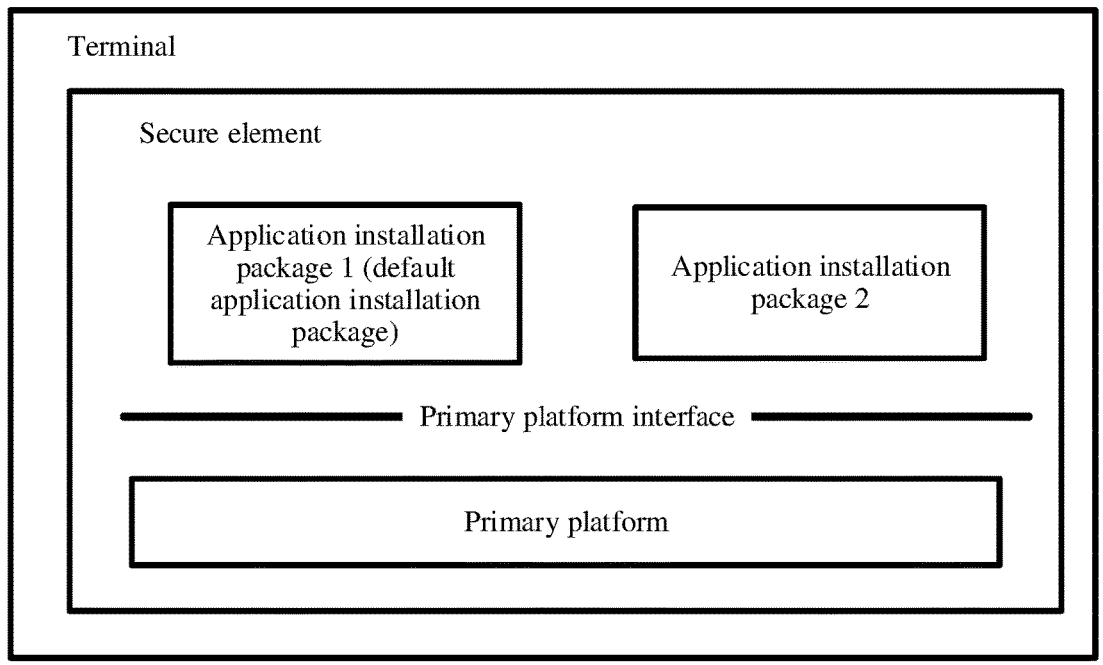
FIG. 1 is a schematic diagram of a terminal according to an embodiment of this application.
Figure 2:
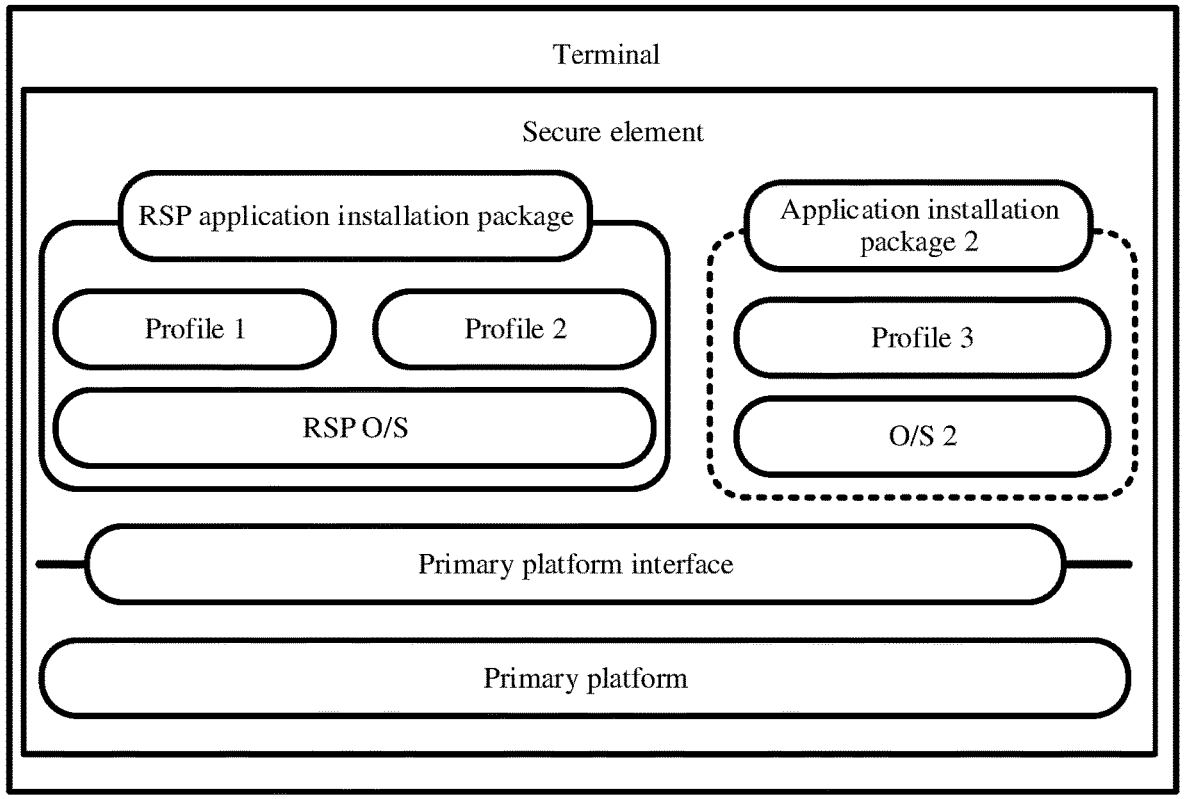
FIG. 2 is a schematic diagram of another terminal according to an embodiment of this application.

An eUICC may run in a secure element of a terminal. As shown in FIG. 1, the secure element may download and install application installation packages provided by a plurality of different service providers. The application installation packages may be referred to as bundles, and examples thereof are a remote SIM provisioning (Remote SIM Provisioning, RSP) RSP application installation package and an application installation package 2, where the RSP 1 is a default (default) application installation package. Herein, a bundle may also be referred to as an image. As shown in FIG. 2, each application installation package may include at least one of a chip operating system (Chip Operating System, COS), a profile (profile), or an application (application, APP). The COS may be referred to as an operating system (Operating System, OS).

A bundle is installed in a primary platform of the terminal. The primary platform includes hardware modules deployed in the secure element, and may include a secure central processing unit (central processing unit, CPU), a random access memory (random access memory, RAM), and a non-volatile memory (Non-volatile Memory, NVM). The NVM includes an internal NVM, a remote NVM, a cipher engine, and the like. A command and data are transmitted between the primary platform and the bundle by using a primary platform interface (Primary Platform Interface).

Each profile has an integrated circuit card identifier (integrated circuit card ID, ICCID) that uniquely identifies the profile. The ICCID may also be referred to as a profile ID.

The profile is a set of operator data and applications and generally includes profile metadata, network access application parameters, other elements in a file system, and the like. The network access application parameters include a user key Ki, an international mobile subscriber identity (international mobile subscriber identity, IMSI), an operator security domain (mobile network operator-Security domain, MNO-SD), supplementary security domains (supplementary security domains, SSD), a controlling authority security domain (controlling authority security domain, CASD), an application (for example, an NFC application), and a JAVA card program. A correspondence between the IMSI and the Ki is used to identify an identity of a user requesting network authentication.

Only one ECASD exists on each eUICC. The ECASD is mainly used to securely store certificates and keys to support a security domain on the eUICC. In a manufacturing process of an eUICC, an EUM needs to install and customize an ECASD. The ECASD may include:

a private key of the eUICC (SK.EUICC.ECDSA), where the private key of the eUICC is used to create a signature of the ECDSA;

a certificate of the eUICC (CERT.EUICC.ECDSA), where the certificate of the eUICC is used to authenticate the eUICC; the certificate of the eUICC includes a public key of the eUICC (PK.EUICC.ECDSA) and a public key (PK.CI.ECDSA) of a GSMA certificate issuer (CI), where the public key of the CI is used to verify a certificate of a network element (for example, an SM-DP+ server) other than the eUICC; and the ECASD may include a plurality of public keys of a same GSMA CI or different GSMA CIs; and a certificate of the EUM (CERT.EUM.ECDSA) and a key set of the EUM, where the secret key set is used to make a secret key and update a certificate.

By using preconfigured keys stored in the ECASD, the terminal performs two-way authentication with a remote server, accesses a network of an operator, verifies legality of a profile download server, and verifies legality of the eUICC and the terminal, so that subsequently a profile is securely downloaded to a target eUICC and installed.

The primary platform of the terminal may download and install a plurality of bundles, where each bundle may include at least one profile, or at least one application, or a combination of the at least one profile and the at least one application. For example, a bundle may include a profile of an operator A, a payment application of an operator B, and an electronic toll collection (Electronic Toll Collection, ETC) of a service provider C.

The primary platform of the terminal may provide a provisioning profile (Provisioning Profile, PP) for connecting to a network to download a profile, and download the profile to the eUICC, where the PP may be an initial networking profile. The profile PP is invisible to the user, and the user does not need to select the PP for use.

Generally, the initial networking profile and authentication information are configured in a pre-provisioned bundle (also referred to as a pre-installed bundle). When downloading a bundle or application programs (Applications, APPs), the terminal can use only the initial networking profile or authentication information in the pre-provisioned bundle to complete networking and authentication with a server corresponding to the to-be-downloaded bundle or applications, and further complete downloading and installation. However, the initial networking or authentication information in the pre-provisioned bundle is suitable only for downloading the APPs in the bundle, and not suitable for downloading other bundles or APPs in other bundles. The APPs may be profiles or other applications (APPs). The other applications may be, for example, an identity application, a driving license application, and a mobile payment application.

The following problems may also exist in this mechanism: 1. If no bundle is pre-installed in the primary platform, no initial networking profile is available for networking with the server, and no authentication information is available for performing security authentication with the server. 2. If a bundle installed in the primary platform is deleted, an initial networking profile and authentication information included in the bundle are deleted, and consequently, no initial networking profile is available in the terminal.

To resolve the foregoing problems, embodiments of this application provide an application installation package downloading method and a terminal. All possible common networking profile and authentication information that may be used for bundles or APPs are prestored in a secure element of a terminal, and may be stored in a default bundle in the secure element or may be stored in a primary platform. Therefore, a networking profile and authentication information in the default bundle or the primary platform may be used to successfully perform authentication with a server and download other bundles or APPs, and a technical problem that because a bundle stores only its available initial networking profile and authentication information, the initial networking profile and authentication information in this bundle cannot be used to download other bundles or APPs in other bundles is resolved. When no networking profile for networking and no authentication information for performing authentication with the server are available in the default bundle, the networking profile and authentication information in the primary platform may be used for networking and authentication with the server to complete downloading or installation of bundles or APPs. In addition, a technical problem that when no bundle is pre-provisioned in the primary platform and no initial networking profile and authentication information required for initially connecting to a network are available, it is impossible to connect to the network and perform authentication and further download bundles or APPs is resolved.

The embodiments of this application further provide a method for managing data in a terminal and the terminal. When deleting, deactivating (disable), or switching (switch) a bundle in a secure element or an APP in the bundle, the terminal determines, based on an installation status of a networking profile in the bundle, whether an operation of deleting, deactivating, or switching the bundle or the APP in the bundle can be performed. If the deleting, deactivating, or switching operation can be performed, the terminal further determines whether the terminal can still continue to connect to a network after the operation of deleting, deactivating, or switching the bundle or the APP in the bundle is performed. If yes, the terminal may prompt a user to perform the operation of deleting, deactivating, or switching the bundle or the APP in the bundle. If no, by using prompt information, the terminal may prompt the user to download and install a new bundle or APP by using a currently activated network and then perform the operation of deleting, deactivating, or switching the bundle or the APP in the bundle. Therefore, an unintentional deleting operation, an unintentional deactivating operation, or an unintentional switching operation of the user that makes it impossible for the terminal to connect to the network is avoided, terminal networking is ensured, and user experience is improved.

It should be understood that in the embodiments of the present invention, a terminal may also be referred to as a system, a subscriber unit, a subscriber station, a mobile station, a mobile, a remote station, a remote terminal, a mobile device, a user terminal, a terminal, a wireless communications device, a user agent, a user apparatus, or user equipment (UE, User Equipment). For example, the terminal may be a cellular phone, a mobile phone, a cordless phone, a smartwatch, a wearable device, a tablet device, an unmanned aerial vehicle, a vending machine, a sensor device, a Session Initiation Protocol (session initiation protocol, SIP) phone, a wireless local loop (wireless local loop, WLL) station, a personal digital assistant (personal digital assistant, PDA), a handheld device having a wireless communication function, a computing device, an in-vehicle communication module, a smart meter, a smart home device, or another processing device connected to a wireless modem.

The following describes the solutions of the embodiments of this application with reference to accompanying drawings. It should be noted that a server mentioned in the embodiments of this application is a server from which bundles or APPs are downloaded, where the mentioned APPs may be profiles or other applications, and the other applications may include, for example, an identity application, a driving license application, and a mobile payment application. In this application, if not specially explained, the mentioned APPs or APP includes at least one of a profile and another application.

An initial networking profile mentioned in the embodiments of this application is a profile used for connecting to a network so that a terminal downloads bundles or APPs when the terminal does not include a profile subscribed to by a user and used for subsequent communication of the terminal or when a profile subscribed to by the terminal is unavailable, and mentioned networking profiles may include an initial networking profile and a subscribed networking profile. Authentication information is information used for mutual authentication between the terminal and the server from which the bundles or APPs are downloaded.

In addition, it should also be noted that the terms "first", "second", "third", and "fourth" mentioned in the embodiments of this application are used only for distinguishing information, and not intended for limiting order of the information.

Figure 3:
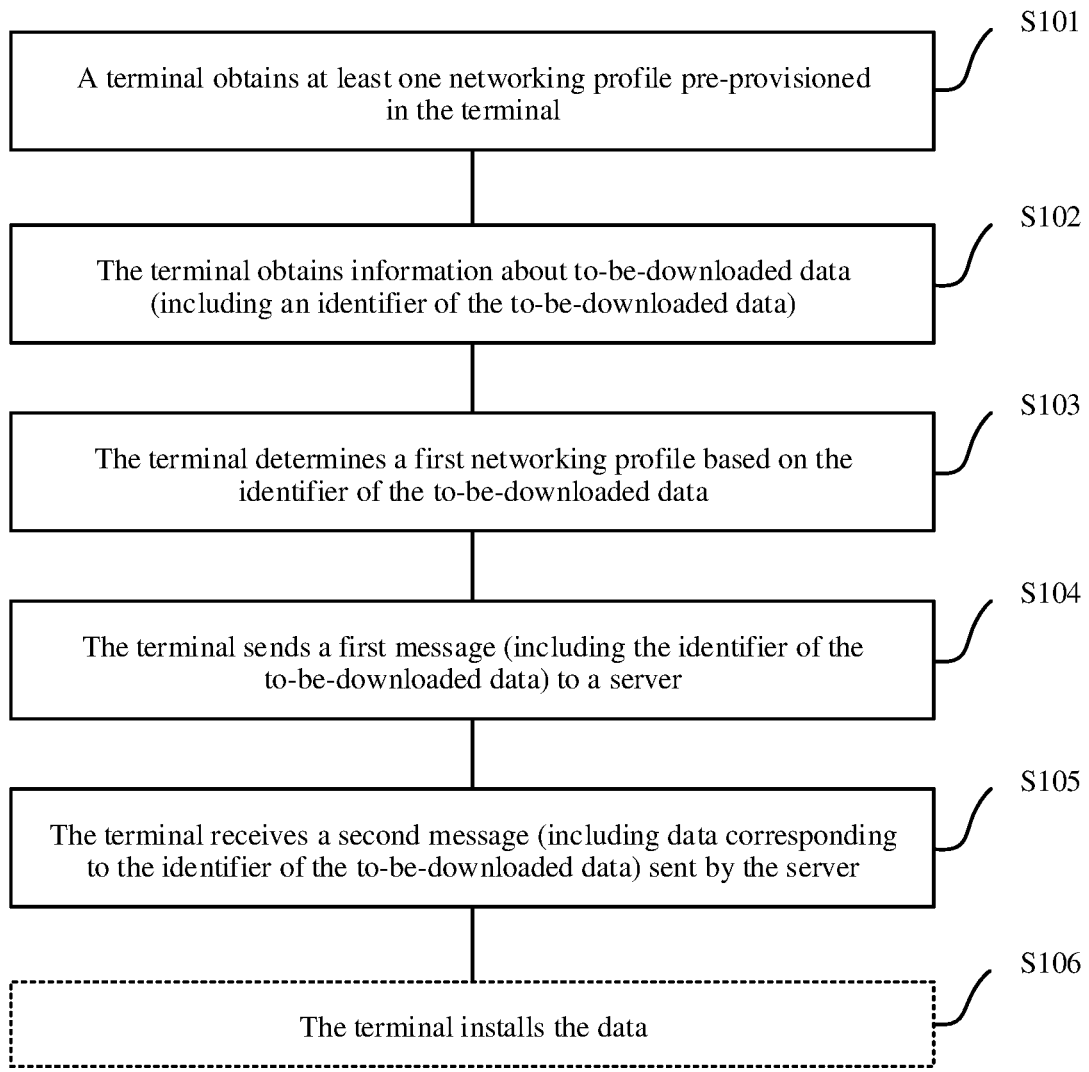
FIG. 3 is a schematic flowchart of a data downloading method according to an embodiment of this application.

FIG. 3 is a flowchart of an application installation package downloading method. As shown in FIG. 3, the method is performed by a terminal, and the method may include the following steps.

S101. The terminal obtains at least one networking profile pre-provisioned in the terminal.

When the terminal is delivered from a factory, a bundle may be pre-provisioned in the terminal, and this bundle may be referred to as a default bundle (default Bundle) or a pre-installed bundle (pre-installed Bundle). At least one networking profile may be pre-provisioned in the pre-provisioned bundle. In this embodiment of this application, "pre-provisioned" may be understood as "pre-installed" or "installed". When the terminal is powered on, the terminal obtains first information pre-provisioned in the terminal, where the first information may include at least one networking profile. In this embodiment of this application, a networking profile may be pre-provisioned in a secure element of the terminal, or may be pre-provisioned in a primary platform of the terminal, or may be pre-provisioned in an installed default application installation package (Bundle) that has a management authority, or may be pre-provisioned in a storage area provided by a top-layer primary platform, or may be pre-provisioned in a system-level APP of the terminal.

Optionally, in this embodiment of this application, authentication information may also be pre-provisioned in the primary platform of the secure element or the installed bundle, and used for two-way authentication with a server, to ensure legality of the server and the terminal and further download bundles or APPs.

S102. The terminal obtains information about to-be-downloaded data.

The information about the to-be-downloaded data includes an identifier of the to-be-downloaded data. The identifier of the to-be-downloaded data may be an identifier of a bundle or an identifier of an APP. The identifier of the APP may be an identifier ICCID of a networking profile or an identifier of an application of another type, for example, a name of an application or an application number provided by an application market or an application store.

Optionally, in this embodiment of this application, the terminal may obtain the information about the to-be-downloaded data in one or any combination of the following manners:
1. obtaining the to-be-downloaded information by using a captured quick response code;
2. obtaining the to-be-downloaded information by receiving information entered by a user;
3. obtaining the to-be-downloaded information by receiving an instruction of the user for selecting the to-be-downloaded information from a local list;
4. obtaining the to-be-downloaded information by receiving a tap of the user on a uniform resource locator (Uniform Resource Locator, URL); and
5. obtaining the to-be-downloaded information by receiving an instruction of the user for starting an application program APP.

The manner of obtaining the information about the to-be-downloaded data is not limited in this embodiment of this application. In addition to the foregoing manner of obtaining the information about the to-be-downloaded data, other known manners may be used to obtain the information about the to-be-downloaded data.

Optionally, the information about the to-be-downloaded data may further include a public key identifier of a certificate issuer CI, certificate information, and the like, used by the terminal to obtain authentication information, where the authentication information is used for two-way authentication between the terminal and the server to verify legality of the server and the terminal. At least one public key identifier of the CI may be included. In an embodiment, when a plurality of public key identifiers of CIs are included, the plurality of public key identifiers of the CIs may be presented in a form of a list.

Optionally, in this embodiment of this application, the information about the to-be-downloaded data may further include an identifier of a networking profile required for downloading the to-be-downloaded data, so that the terminal can quickly find, from the at least one networking profile pre-provisioned in the terminal, the networking profile required for downloading the to-be-downloaded data, and further download data corresponding to the identifier of the to-be-downloaded data.

Authentication information pre-provisioned in the terminal may be pre-provisioned in the secure element of the terminal, or may be pre-provisioned in the primary platform of the secure element, or may be pre-provisioned in the installed default application installation package (Bundle) that has the management authority.

S103. The terminal determines a first networking profile based on the identifier of the to-be-downloaded data.

The first networking profile is a networking profile used by the terminal for networking and required for downloading the to-be-downloaded data, and the to-be-downloaded data is downloaded from the server to which the networking profile is directed. The first networking profile is included in the at least one networking profile pre-provisioned in the terminal.

Optionally, in an embodiment, the terminal finds, based on the identifier of the to-be-downloaded data, from the at least one networking profile pre-provisioned in the terminal, the first networking profile required for downloading the to-be-downloaded data, so that the terminal uses the first networking profile for networking and downloads the data.

Optionally, in another embodiment, when the information about the to-be-downloaded data includes the identifier of the networking profile required for downloading the to-be-downloaded data, the terminal may find, based on the identifier of the networking profile, from the at least one networking profile pre-provisioned in the terminal, the first networking profile required for downloading the to-be-downloaded data. Therefore, time for searching for the first networking profile by the terminal can be reduced, and time for terminal networking can be reduced.

S104. The terminal sends a first message to the server.

The first message includes the identifier of the to-be-downloaded data.

Optionally, in this embodiment of this application, before the terminal sends the first message to the server, the terminal may first perform two-way authentication with the server to ensure legality of the server and the terminal and further ensure security of the downloaded information. When the information about the to-be-downloaded data includes the public key identifier of the CI, the terminal may obtain authentication information based on the public key identifier of the CI. The authentication information may be authentication information pre-provisioned in the terminal, or may be authentication information obtained by the terminal from an authentication server based on the public key identifier of the CI. Obtaining authentication information from the authentication information pre-provisioned in the terminal may include reading corresponding authentication information from the default application installation package based on the public key identifier of the CI, or an identifier of a bundle, or an identifier of an APP, or reading corresponding authentication information from the primary platform.

In an optional embodiment, the first information may further include at least one piece of authentication information. The terminal obtains the authentication information based on the public key identifier of the CI and completes two-way authentication with the server by using the authentication information. The process may be: the terminal first searches whether the authentication information pre-provisioned in the terminal includes the authentication information corresponding to the public key identifier of the CI; and when the authentication information corresponding to the public key identifier of the CI exists, the terminal uses the authentication information pre-provisioned in the terminal to complete two-way authentication with the server; or when the authentication information corresponding to the public key identifier of the CI does not exist, the terminal may obtain the authentication information from the authentication server based on the public key identifier of the CI, and then complete two-way authentication with the server by using the obtained authentication information.

When the terminal completes two-way authentication with the server and the two-way authentication succeeds, the terminal sends the first message including the identifier of the to-be-downloaded data to the server, requesting to obtain the data corresponding to the identifier of the to-be-downloaded data from the server.

Optionally, in another embodiment of this application, the process in which the terminal sends the first message to the server may include a process of two-way authentication between the terminal and the server. A specific process is shown in FIG. 4.

Figure 4:
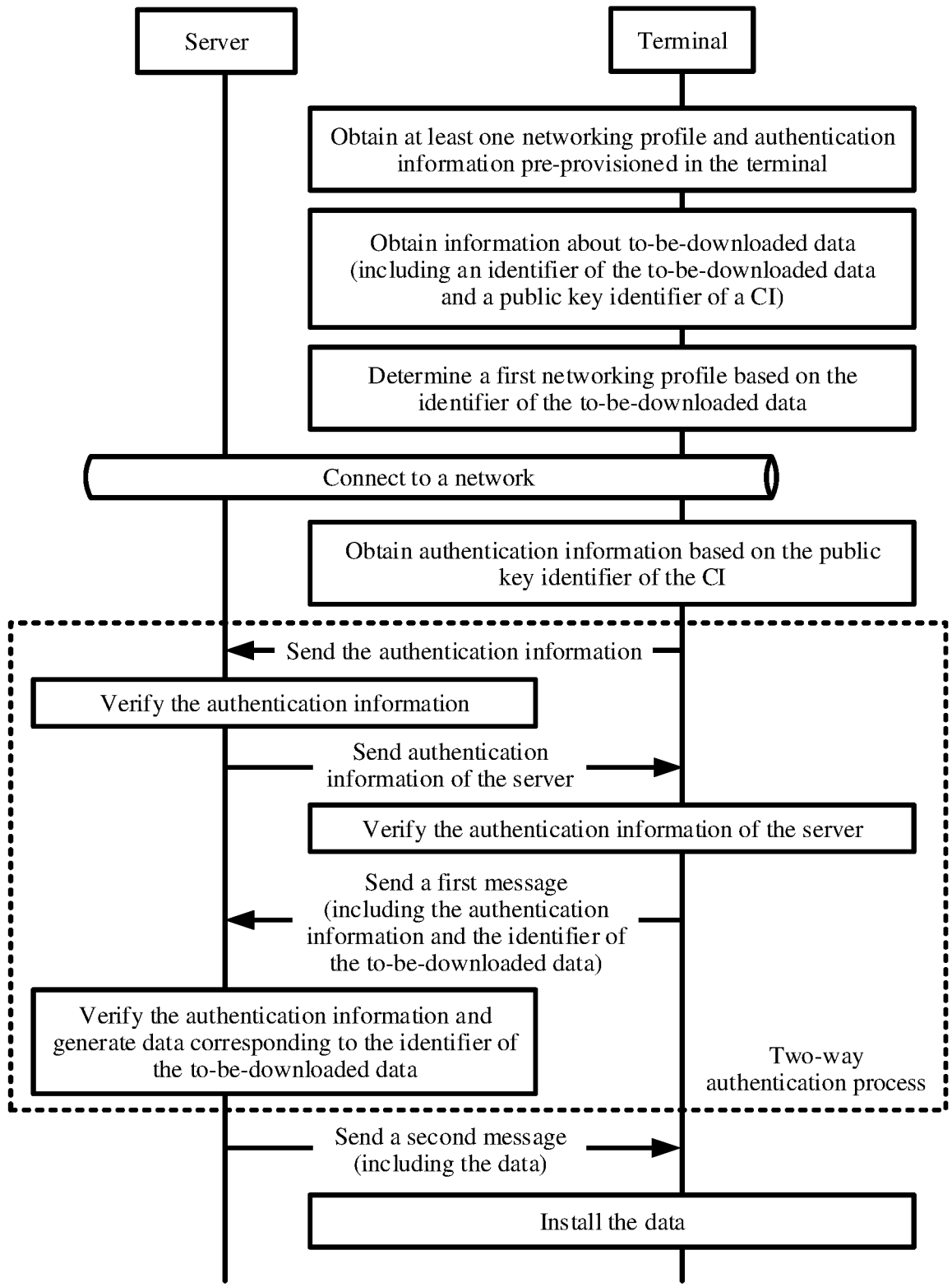
FIG. 4 is a schematic flowchart of two-way authentication between a server and a terminal according to an embodiment of this application.

In FIG. 4, when the terminal obtains the authentication information, the terminal sends the authentication information to the server to obtain authentication information of the server from the server; when the terminal authenticates the server by using the authentication information of the server and the authentication succeeds, the terminal sends authentication information of the terminal to the server, where the authentication information of the terminal carries the identifier of the to-be-downloaded data, so that the server authenticates the terminal by using the authentication information of the terminal; when the authentication succeeds, the server generates the data corresponding to the identifier of the to-be-downloaded data, and sends the data to the terminal; and the terminal receives the data sent by the server. In a possible embodiment, the data received by the terminal is data ciphered by the server.

S105. The terminal receives a second message sent by the server, where the second message includes the data corresponding to the identifier of the to-be-downloaded data.

By using the data downloading method, the at least one networking profile is pre-provisioned in the terminal, and when the terminal downloads the to-be-downloaded data, networking is performed by using the pre-provisioned at least one networking profile, thereby implementing downloading of the to-be-downloaded data. Therefore, a technical problem in the prior art that a networking profile is pre-provisioned in a default bundle and the networking profile is suitable only for downloading APPs in the default bundle and unsuitable for downloading other bundles or APPs in other bundles is avoided.

In addition, if authentication information is also pre-provisioned in the terminal, when downloading the to-be-downloaded data, the terminal may perform two-way authentication with the server by using the authentication information pre-provisioned in the terminal, to improve security of the to-be-downloaded data.

In an optional embodiment, when authentication information is pre-provisioned in the installed bundle, the terminal performs two-way authentication with the server by using the authentication information pre-provisioned in the installed bundle; or when authentication information is not pre-provisioned in the installed bundle, the terminal performs two-way authentication with the server by using authentication information in the primary platform. Therefore, a technical problem in the prior art that because authentication information exists only in an installed bundle, when the bundle is not installed in a terminal, that is, when no authentication information exists, it is impossible to perform two-way authentication with a server even if a networking profile is used for networking is avoided.

It should be noted that in this embodiment, step numbers do not represent magnitude or order, but represent only a logical relationship. For example, step S102 in which the terminal obtains the information about the to-be-downloaded data may temporally precede step S101 in which the terminal obtains the at least one networking profile pre-provisioned in the terminal, but this is not limited. In this embodiment of this application, the step in which the terminal obtains the information about the to-be-downloaded data needs to satisfy a logical relationship, that is, should be performed before S103 in which the terminal determines the first networking profile based on the identifier of the to-be-downloaded data.

Optionally, in this embodiment of this application, as shown in FIG. 3, after the terminal receives the second message sent by the server, the downloading method may further include:

S106. The terminal installs the data.

In an embodiment, when the data is a bundle, the terminal delivers the data to the primary platform of the terminal, and the primary platform of the terminal allocates a security domain to the data and installs the bundle in the security domain.

In an embodiment, when the data is an APP, the terminal installs the data in a bundle of the APP.

Optionally, in an embodiment of this application, that the terminal determines the first networking profile based on the identifier of the to-be-downloaded data may include: when the at least one profile pre-provisioned in the terminal includes a networking profile for downloading the data, the terminal uses the at least one profile as the first networking profile. The networking profile may be an initial networking profile or a subscribed networking profile.

Optionally, in an optional embodiment, the at least one networking profile pre-provisioned in the terminal may be pre-provisioned in at least one of the installed bundle and the primary platform of the terminal. This includes three cases: 1. The at least one networking profile is installed only in the installed bundle. 2. The at least one networking profile is installed only in the primary platform. 3. The at least one networking profile is installed in both the installed bundle and the primary platform.

Optionally, in an embodiment, that the terminal determines the first networking profile based on the identifier of the to-be-downloaded data includes:

when the installed application installation package of the terminal includes the pre-provisioned at least one networking profile, the terminal determines whether the at least one networking profile includes the networking profile required for downloading the to-be-downloaded data; and when the installed application installation package includes the networking profile required for downloading the to-be-downloaded data, the terminal uses the at least one networking profile in the installed application installation package as the first networking profile, that is, the networking profile required for downloading the to-be-downloaded data; or when the at least one networking profile included in the installed application installation package does not include the networking profile required for downloading the to-be-downloaded data, the terminal uses the at least one networking profile pre-provisioned in the primary platform as the first networking profile, that is, the networking profile required for downloading the to-be-downloaded data; or when the installed application installation package of the terminal does not include the pre-provisioned at least one networking profile, the terminal uses the at least one networking profile pre-provisioned in the primary platform as the first networking profile, that is, the networking profile required for downloading the to-be-downloaded data.

Figure 5A:
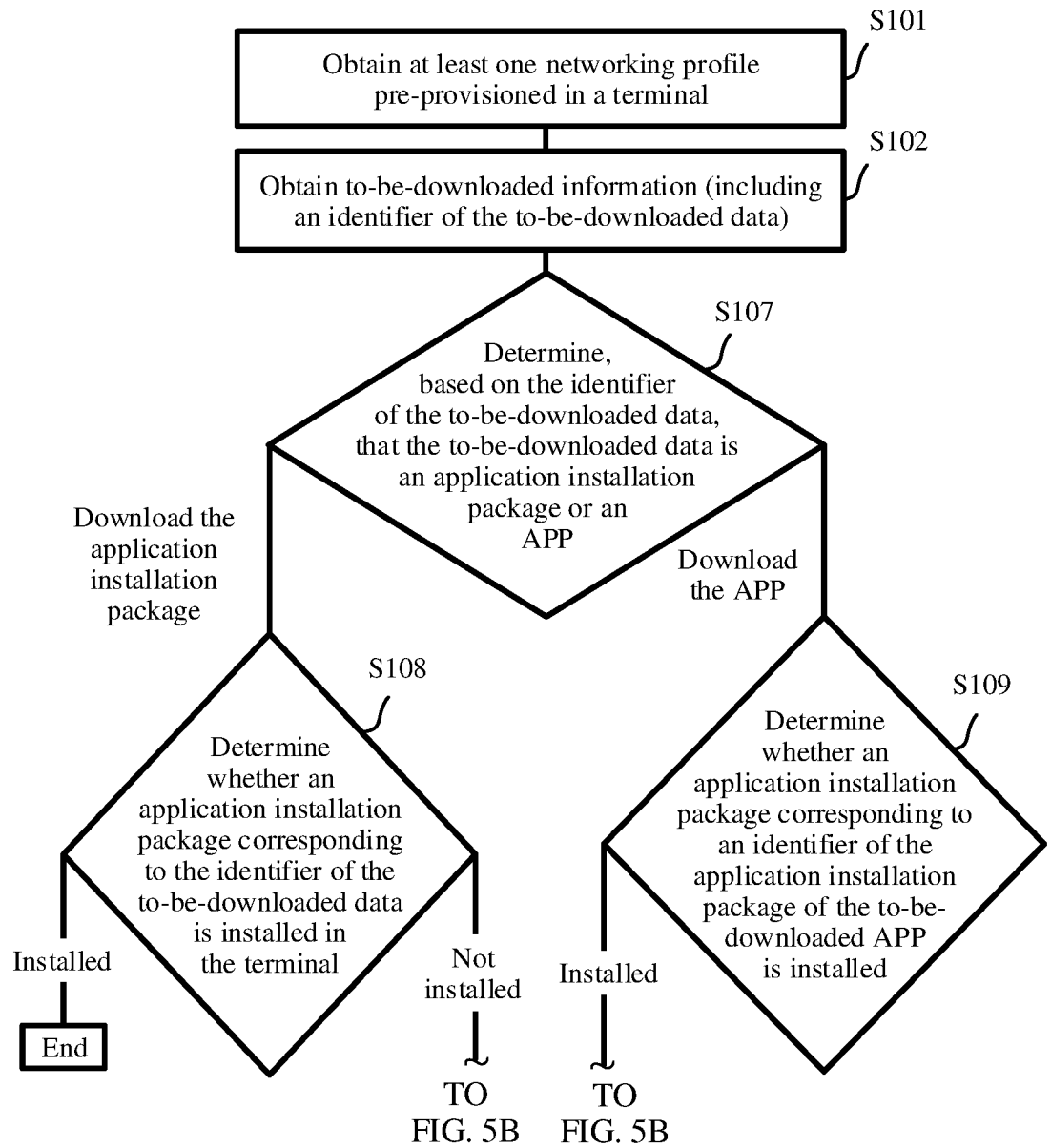
FIG. 5A and FIG. 5B are a schematic flowchart of a data downloading method according to an embodiment of this application.

Optionally, in this embodiment of this application, as shown in FIG. 5A, after the terminal obtains the information about the to-be-downloaded data, the downloading method may further include:

S107. The terminal determines, based on the identifier of the to-be-downloaded data, that the to-be-downloaded data is an application installation package or an APP.

When the to-be-downloaded data is an application installation package, the downloading method further includes:

S108. The terminal determines whether an application installation package corresponding to the identifier of the to-be-downloaded data is installed in the terminal.

When the application installation package corresponding to the identifier of the to-be-downloaded data is not installed in the terminal, S103 is performed: The terminal determines, based on the identifier of the to-be-downloaded data, the first networking profile, that is, the networking profile required for downloading the to-be-downloaded data; otherwise, the terminal terminates downloading of the to-be-downloaded data.

As shown in FIG. 5A, when the to-be-downloaded data is an APP, the information about the to-be-downloaded data further includes an identifier of an application installation package of the to-be-downloaded APP, and the downloading method further includes:

S109. The terminal determines whether the application installation package corresponding to the identifier of the application installation package of the to-be-downloaded APP is installed.

When the application installation package of the to-be-downloaded APP is installed in the terminal, S110 is performed. Otherwise, S103 is performed.

S110. The terminal determines whether the application installation package of the to-be-downloaded APP includes a networking profile required for downloading the to-be-downloaded APP.

If yes, the terminal uses the networking profile in the application installation package of the to-be-downloaded APP for networking, and downloads the APP. The downloading process is the same as that in the prior art. Details are not described herein. Optionally, after the APP is downloaded, the downloading method may further include: installing the APP in the application installation package of the APP. The networking profile used for networking, in the application installation package of the to-be-downloaded APP, may be the subscribed networking profile already used for networking or the initial networking profile.

If no, S103 and S104 are performed based on the identifier of the application installation package of the to-be-downloaded APP.

Figure 6:
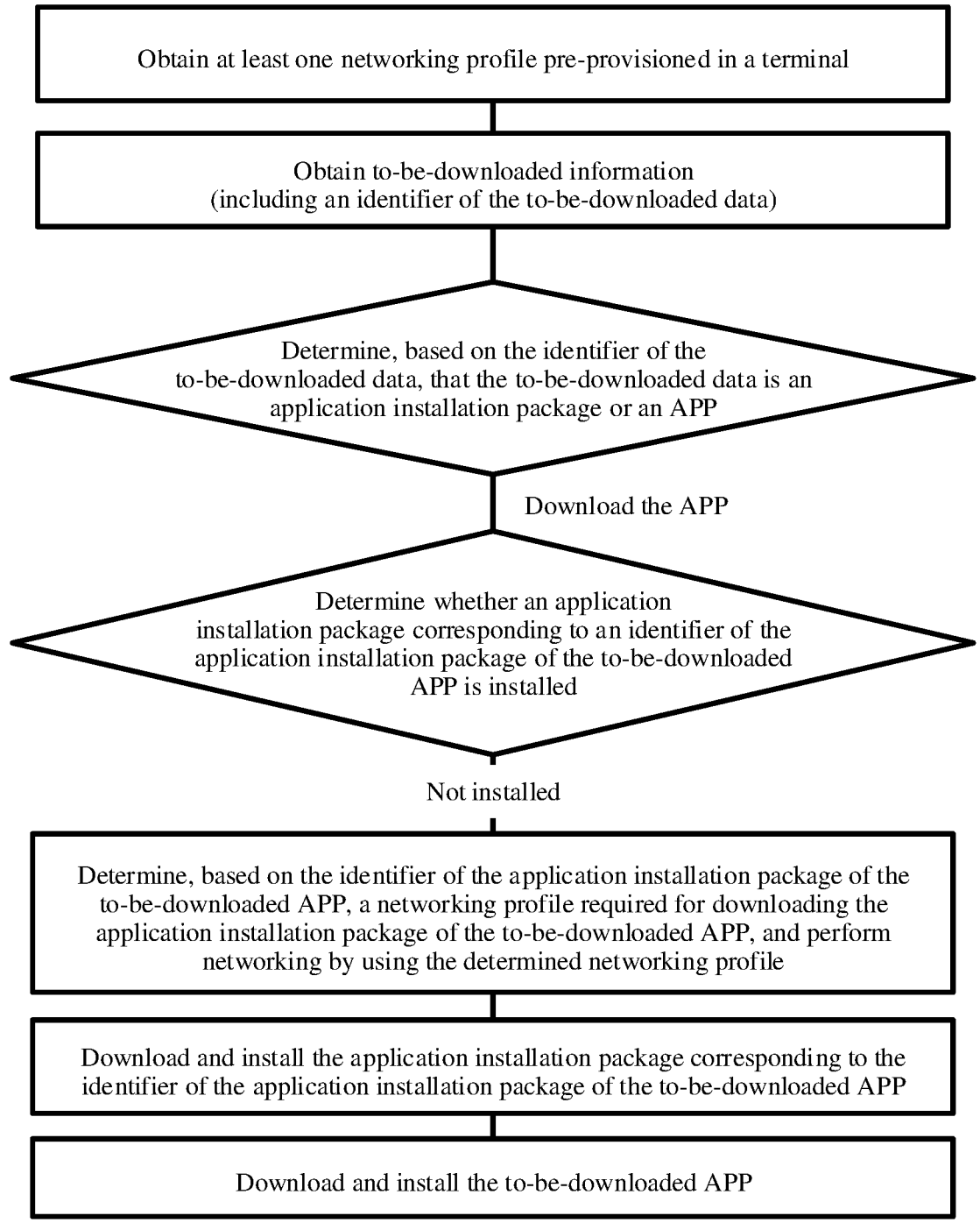
FIG. 6 is a schematic flowchart of a data downloading method according to an embodiment of this application.

As shown in FIG. 6, when the application installation package corresponding to the identifier of the application installation package of the to-be-downloaded APP is not installed in the terminal, the terminal determines the first networking profile based on the identifier of the application installation package of the to-be-downloaded APP. The process in which the terminal determines the first networking profile based on the identifier of the application installation package is the same as the process of S103 in FIG. 3. For brevity, details are not described again herein.

Subsequently, the terminal requests to download, from the server, data corresponding to the identifier of the application installation package of the to-be-downloaded APP; the terminal receives the data corresponding to the identifier of the application installation package of the to-be-downloaded APP and sent by the server, and installs the data in the primary platform of the terminal; then the terminal requests to download, from the server, data corresponding to an identifier of the to-be-downloaded APP; and the terminal receives the data that is of the to-be-downloaded APP and is sent by the server, and installs the data in the downloaded application installation package. In this embodiment of this application, that the terminal requests to download, from the server, data corresponding to the identifier of the application installation package of the to-be-downloaded APP, and that the terminal requests to download the to-be-downloaded APP from the server, may both be that the terminal sends a message to the server, where the message includes the identifier of the application installation package of the to-be-downloaded APP or the identifier of the to-be-downloaded APP, to obtain the corresponding data.

In this embodiment of this application, the terminal further includes a management module, which may also be referred to as a management apparatus, a bundle management module, or a bundle management apparatus. The bundle management module may be installed in the secure element of the terminal, and specifically, may be installed in the default bundle in the secure element or may be installed in the primary platform of the secure element. The bundle management module is configured to manage, in a unified manner, all bundles and APPs installed in the secure element.

Figure 7:
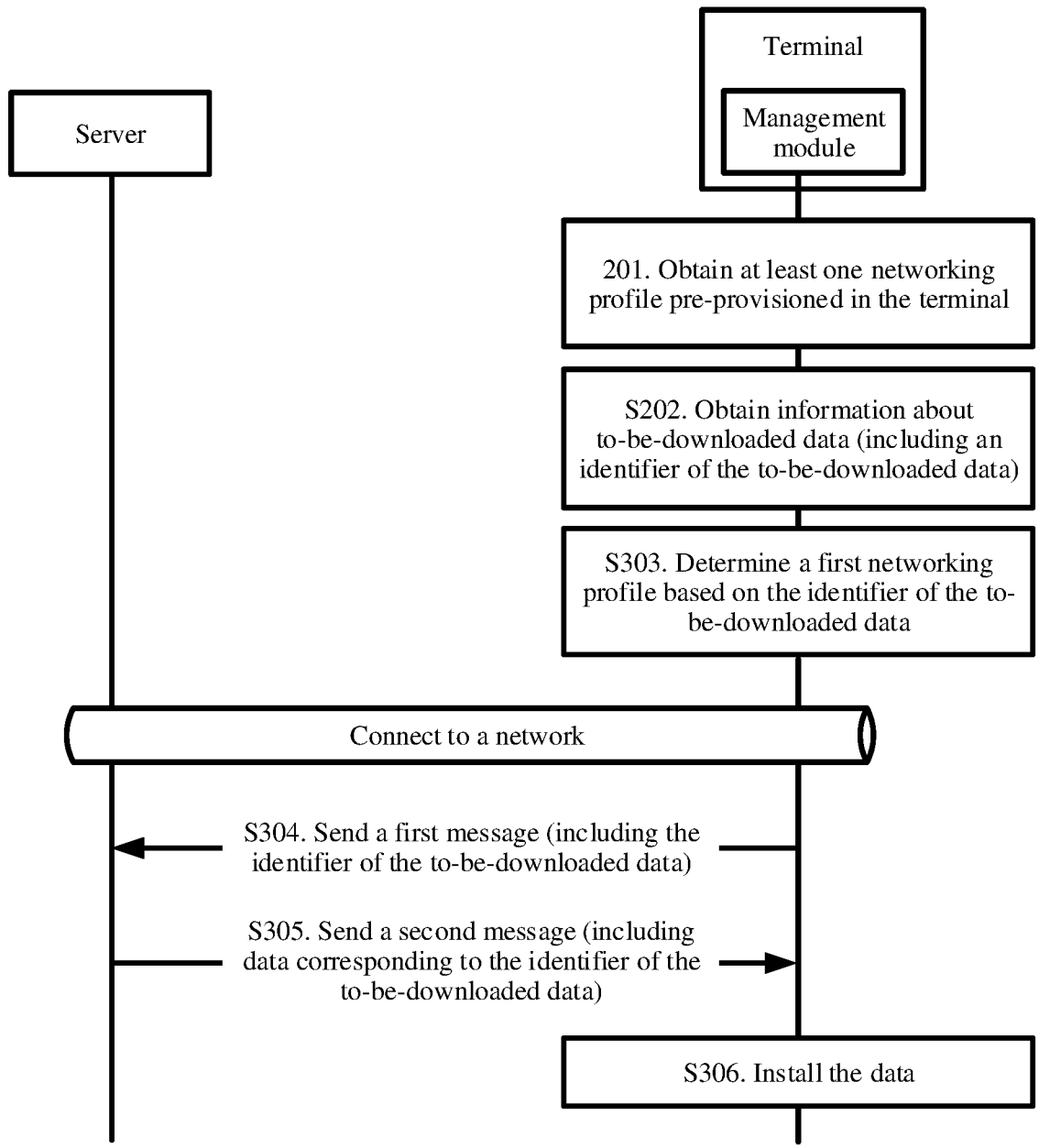
FIG. 7 is a schematic flowchart of another data downloading method according to an embodiment of this application.

Steps of the method performed by the terminal in FIG. 3 to FIG. 6 may all be performed by the bundle management module. A specific process is shown in FIG. 7. FIG. 7 is a flowchart of a data downloading method according to an embodiment of this application. The method may include the following steps.

S201. A management module obtains at least one networking profile pre-provisioned in a terminal.

S202. The management module obtains information about to-be-downloaded data, where the information about the to-be-downloaded data includes an identifier of the to-be-downloaded data.

S203. The management module determines a first networking profile based on the identifier of the to-be-downloaded data, where the first networking profile is included in the at least one networking profile, and the first networking profile is used by the terminal for networking.

S204. The management module sends a first message to a server, where the first message includes the identifier of the to-be-downloaded data.

S205. The management module receives a second message sent by the server, where the second message includes data corresponding to the identifier of the to-be-downloaded data.

In this embodiment, the process of S201 to S205 is the same as the process of S101 to S105 in FIG. 3. For brevity, details are not described again herein.

By using the data downloading method, the at least one networking profile is pre-provisioned in the terminal, and when the management module downloads the to-be-downloaded data, networking is performed by using the pre-provisioned at least one networking profile, thereby implementing downloading of the to-be-downloaded data. Therefore, a technical problem in the prior art that a networking profile is pre-provisioned in a default bundle and the networking profile is suitable only for downloading APPs in the default bundle and unsuitable for downloading other bundles or APPs in other bundles is avoided.

In addition, if authentication information is also pre-provisioned in the terminal, when downloading the to-be-downloaded data, the terminal may perform two-way authentication with the server by using the authentication information pre-provisioned in the terminal, to improve security of the to-be-downloaded data. The authentication information may be stored in a default bundle or a primary platform. In addition, a technical problem in the prior art that because authentication information exists only in an installed bundle, when the bundle is not installed in a terminal, that is, when no authentication information exists, it is impossible to perform two-way authentication with a server and further download bundles or APPs even if a networking profile is used for networking is avoided.

Optionally, in an embodiment, as shown in FIG. 7, after the management module receives the second message sent by the server, the downloading method may further include:

S206. The management module installs the data.

In an embodiment, when the data is a bundle, the management module delivers the data to the primary platform of the terminal, and the primary platform of the terminal allocates a security domain to the data and installs the bundle in the security domain.

In an embodiment, when the data is an APP, the management module installs the data in a bundle of the APP.

Optionally, in an embodiment of this application, that the management module determines a first networking profile based on the identifier of the to-be-downloaded data may include: when the at least one profile pre-provisioned in the terminal includes a networking profile for downloading the data, the management module uses the at least one profile as the first networking profile.

Optionally, in an optional embodiment, the at least one networking profile pre-provisioned in the terminal may be pre-provisioned in at least one of an installed bundle and the primary platform of the terminal.

Optionally, in an embodiment, that the management module determines a first networking profile based on the identifier of the to-be-downloaded data includes:

when an installed application installation package of the terminal includes the pre-provisioned at least one networking profile, the management module determines whether the at least one networking profile includes a networking profile required for downloading the to-be-downloaded data; and when the installed application installation package includes the networking profile required for downloading the to-be-downloaded data, the management module uses the at least one networking profile in the installed application installation package as the first networking profile, that is, the networking profile required for downloading the to-be-downloaded data, where the networking profile includes an initial networking profile or a subscribed networking profile, the initial networking profile may be an initial networking profile capable of global roaming and used for downloading a subscribed profile, and the subscribed networking profile is a profile used for normal networking and communication; or when the at least one networking profile included in the installed application installation package does not include the networking profile required for downloading the to-be-downloaded data, the management module uses the at least one networking profile pre-provisioned in the primary platform as the first networking profile, that is, the networking profile required for downloading the to-be-downloaded data; or when the installed application installation package of the terminal does not include the pre-provisioned at least one networking profile, the management module uses the at least one networking profile pre-provisioned in the primary platform as the first networking profile, that is, the networking profile required for downloading the to-be-downloaded data.

Figure 8A:
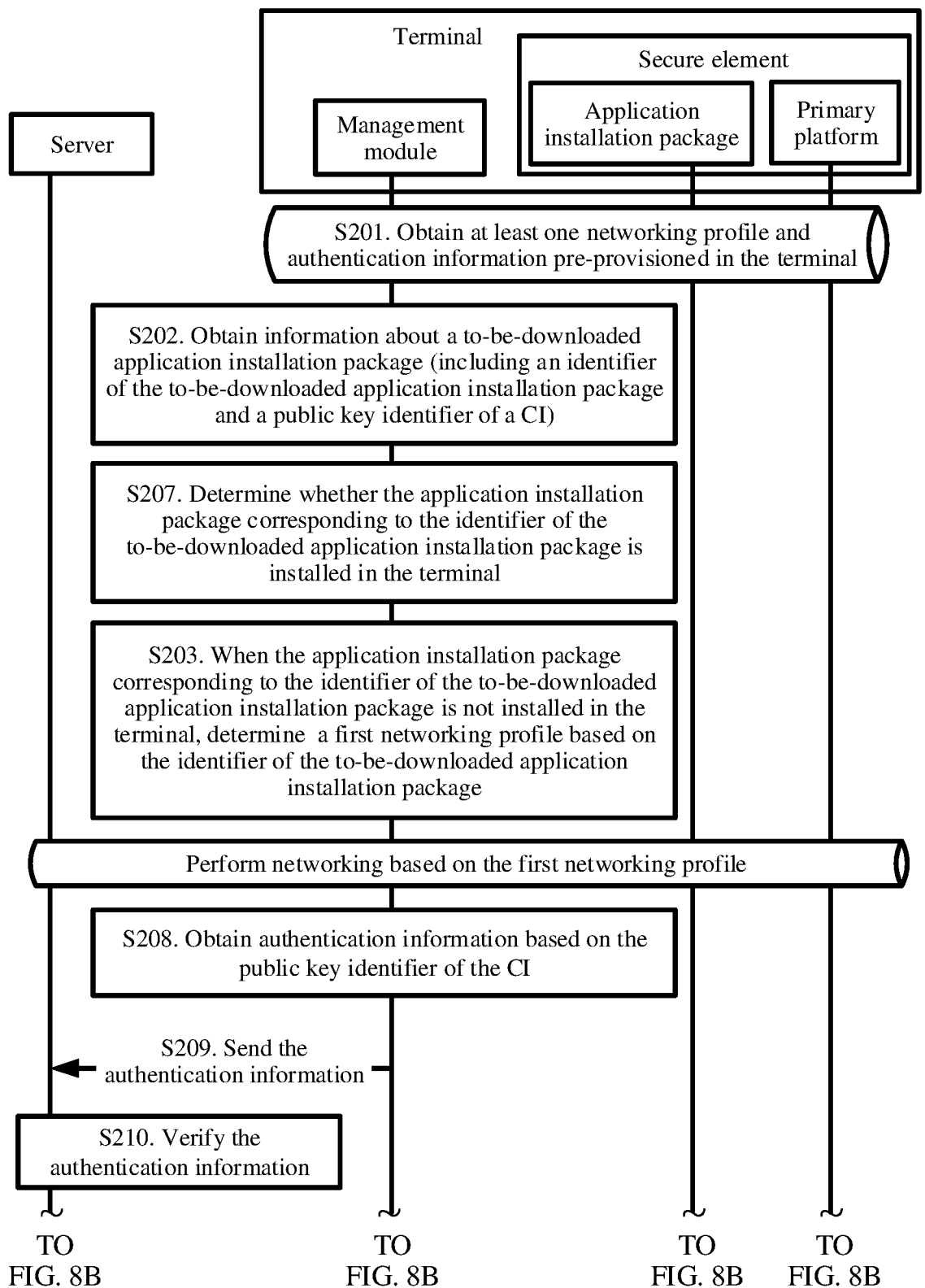
FIG. 8A and FIG. 8B are a schematic flowchart of an application installation package downloading method according to an embodiment of this application.

Optionally, when the to-be-downloaded data is an application installation package, as shown in FIG. 8A, the method includes:

S207. The management module determines whether an application installation package corresponding to the identifier of the to-be-downloaded data is installed in the terminal.

When the application installation package corresponding to the identifier of the to-be-downloaded data is not installed in the terminal, S203 is performed: The terminal determines the first networking profile based on the identifier of the to-be-downloaded data.

The process of determining the first networking profile is the same as the process of S103 in FIG. 3. For brevity, details are not described again herein.

After determining the first networking profile, the management module performs networking based on the first networking profile and obtains the pre-provisioned authentication information from the terminal based on a public key identifier of a CI in the to-be-downloaded information. In this embodiment of this application, the authentication information pre-provisioned in the terminal may alternatively be pre-provisioned in a secure element of the terminal, and may be specifically pre-provisioned in at least one of an installed application installation package and the primary platform of the secure element.

When the authentication information is pre-provisioned in at least one of the installed application installation package and the primary platform of the terminal, the downloading method may further include:

S208. The management module may first obtain authentication information from the installed application installation package.

Figure 8B:
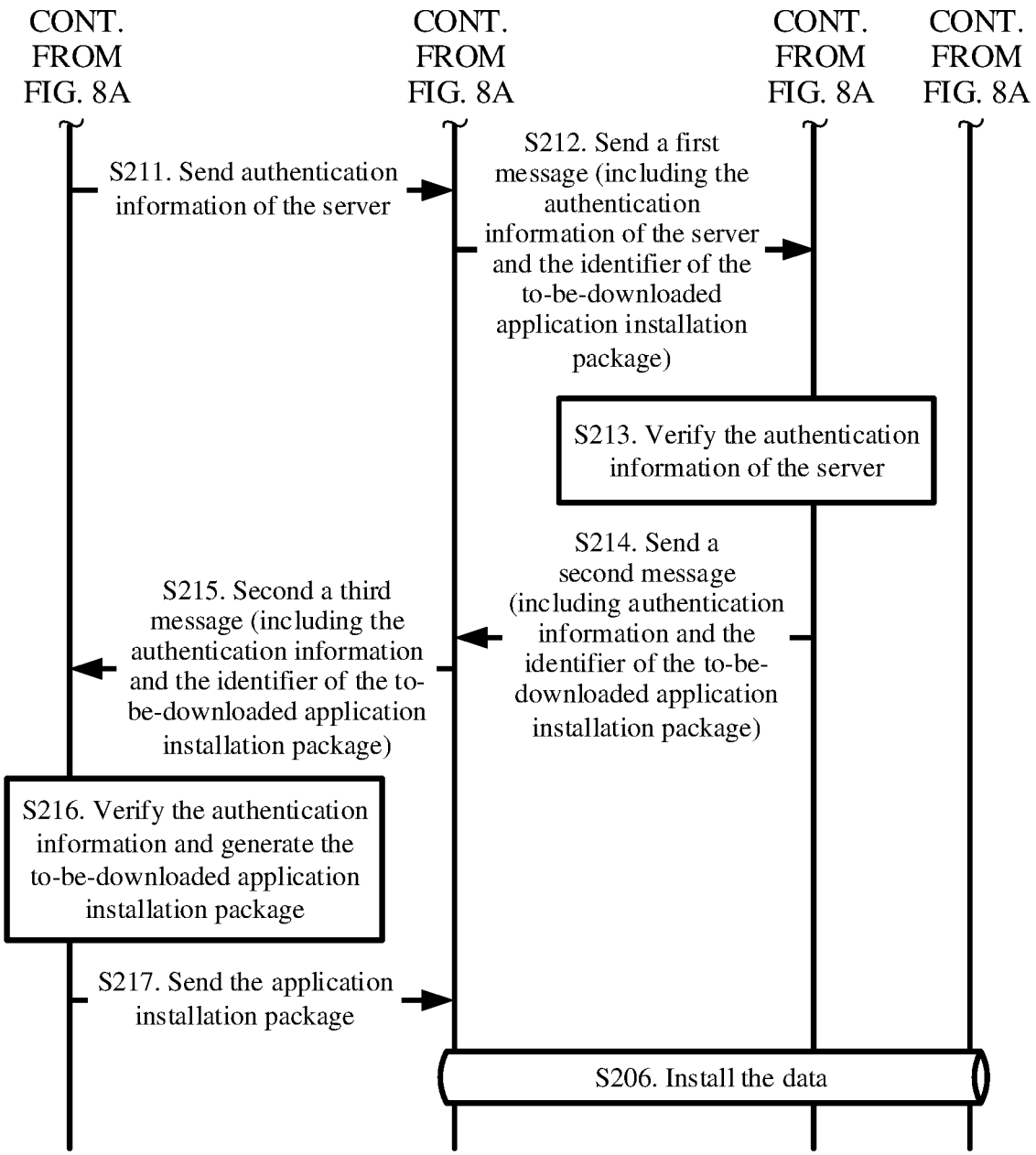

If existent, the authentication information in the installed application installation package is used to complete two-way authentication between the server and the secure element, as shown in FIG. 8B.

Optionally, if required authentication information does not exist in the installed application installation package, the management module obtains the required authentication information from authentication information pre-provisioned in the primary platform. If the required authentication information exists in the authentication information pre-provisioned in the primary platform, the authentication information pre-provisioned in the primary platform is used to complete two-way authentication between the server and the secure element.

Optionally, if the required authentication information does not exist in the authentication information pre-provisioned in the primary platform, the management module obtains authentication information from an authentication server based on the public key identifier of the CI, to perform two-way authentication between the server and the secure element by using the obtained authentication information.

A process of two-way authentication between the server and the secure element may specifically include the following steps: S209. The management module sends authentication information to the server.

In this embodiment of this application, the management module sends first authentication information or second authentication information to the server, so that the server verifies the authentication information and sends authentication information of the server to the management module.

S210. The server verifies the authentication information. If the verification succeeds, S211 is performed. Otherwise, downloading of the application installation package is terminated.

S211. The server sends authentication information of the server to the management module.

S212. The management module sends a first message to the secure element, where the first message includes the authentication information of the server and an identifier of the to-be-downloaded application installation package.

The management module sends the authentication information of the server to the secure element, where the authentication information of the server carries the identifier of the to-be-downloaded application installation package, so that the secure element authenticates the server.

S213. The secure element verifies the authentication information of the server. If the verification succeeds, S214 is performed. Otherwise, downloading of the application installation package is terminated.

S214. The secure element sends a second message to the management module, where the second message includes authentication information and the identifier of the to-be-downloaded application installation package.

S215. The management module sends a third message to the server, where the third message includes the authentication information and the identifier of the to-be-downloaded application installation package.

S216. The server verifies the authentication information and generates the to-be-downloaded application installation package.

When the server successfully verifies the authentication information, the management module generates the application installation package corresponding to the identifier of the to-be-downloaded application installation package.

S217. The server sends the application installation package to the management module.

Optionally, in this embodiment of this application, after the management module receives the application installation package sent by the server, the management module may send the application installation package to the primary platform of the secure element, and the primary platform allocates a security domain to the application installation package and installs the application installation package in the allocated security domain.

Figure 5B:
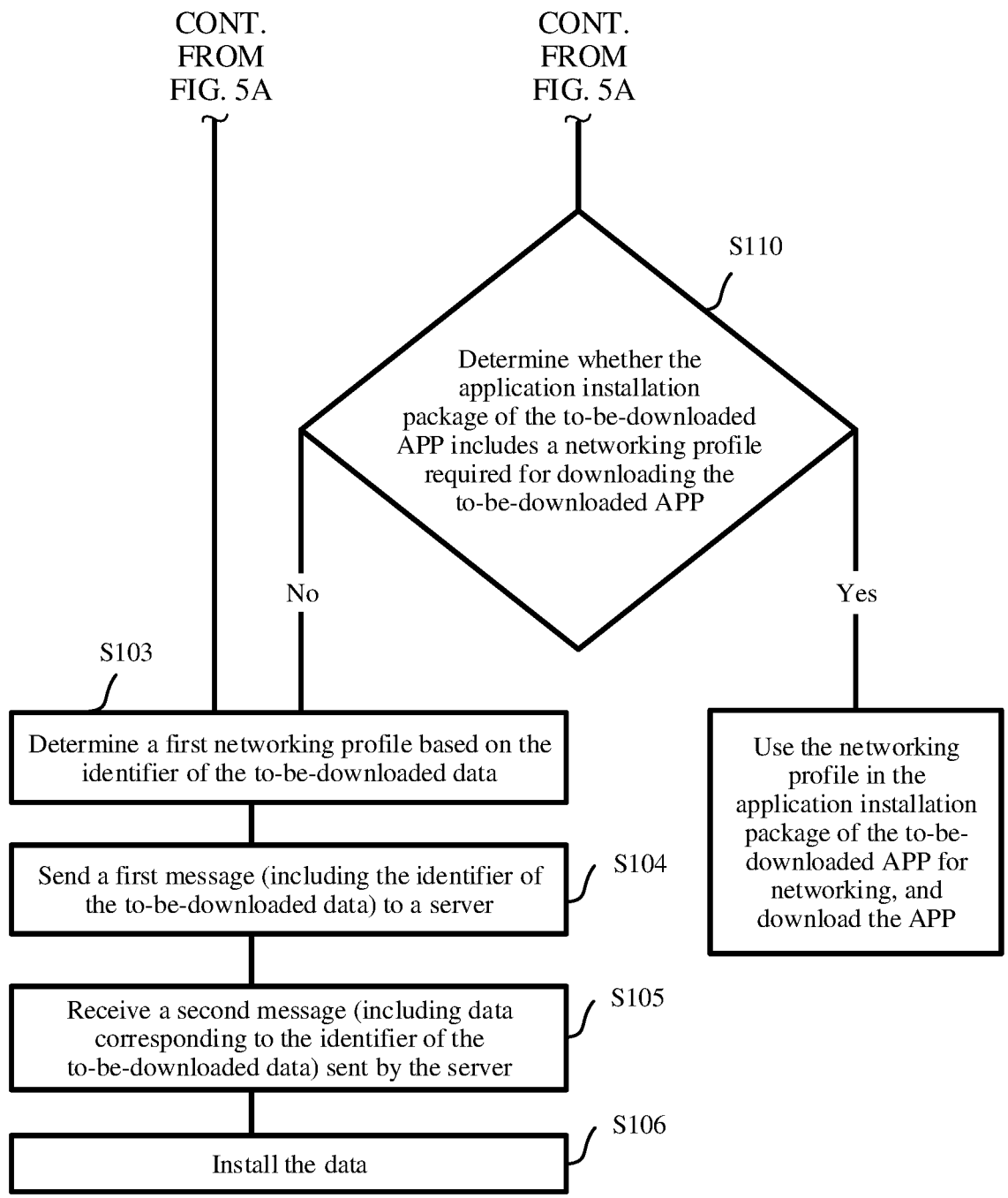
Figure 9A:
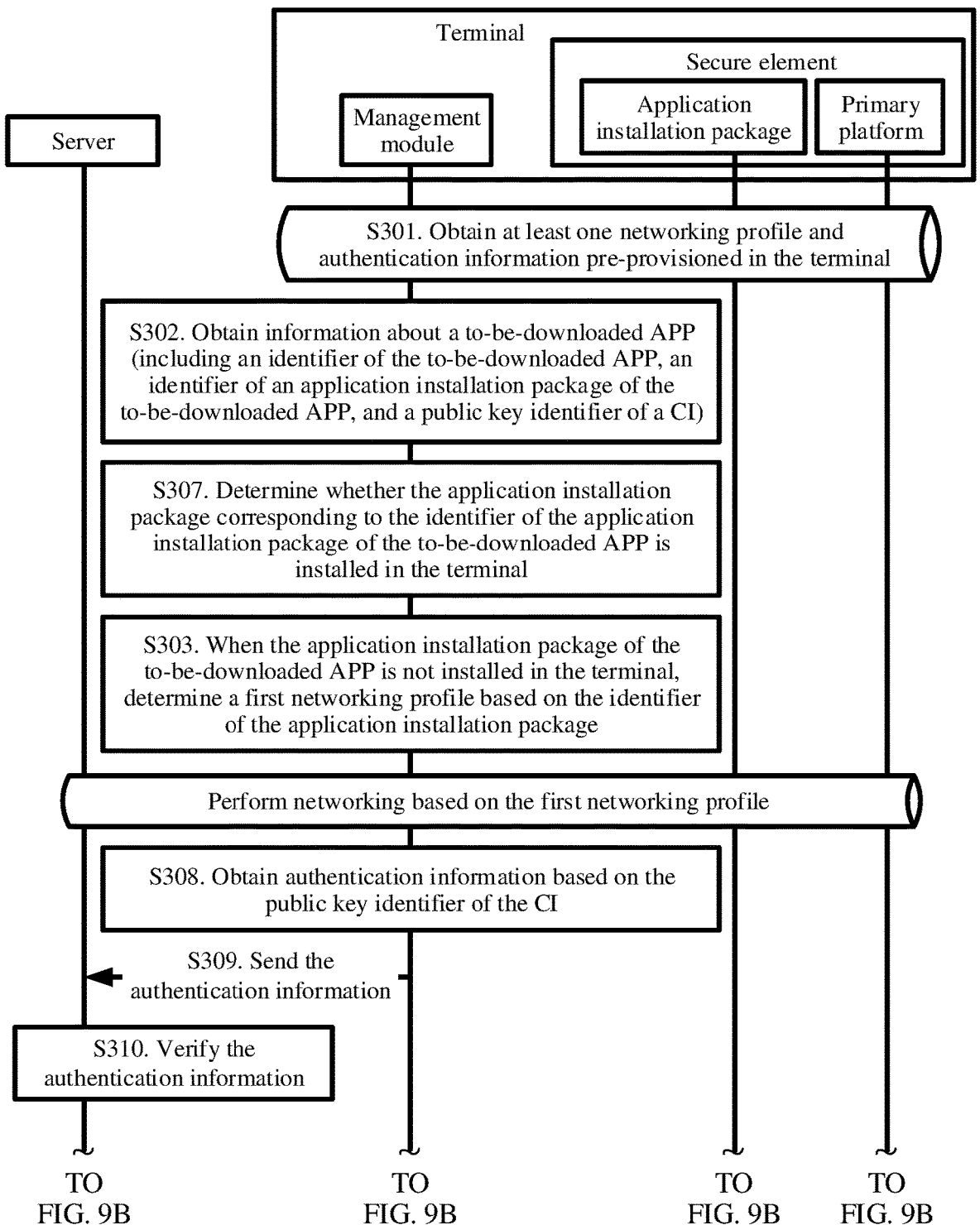
FIG. 9A and FIG. 9B are a schematic flowchart of an APP downloading method according to an embodiment of this application.
Figure 9B:
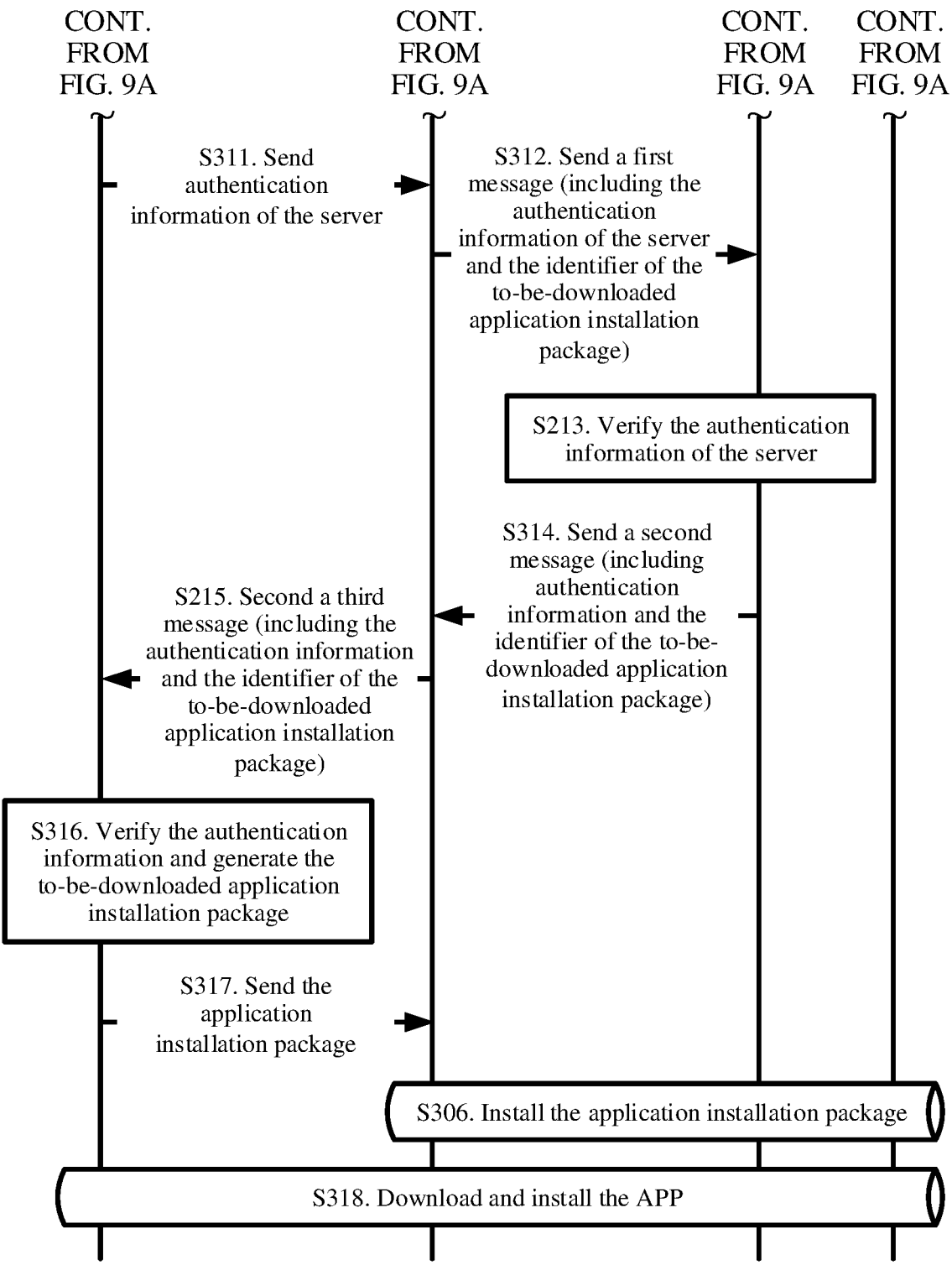

With reference to FIG. 9A and FIG. 9B, the following describes a solution when to-be-downloaded data is an APP. The solution shown in FIG. 9A and FIG. 9B differs from the solution shown in FIG. 8A and FIG. 8B in that after the management module obtains information about a to-be-downloaded APP, the solution further includes: S307. The management module determines, based on an identifier of an application installation package of the to-be-downloaded APP in the information about the to-be-downloaded APP, whether the application installation package corresponding to the identifier of the application installation package of the to-be-downloaded APP has been installed in the terminal. When the application installation package of the to-be-downloaded APP has been installed in the terminal, S110 in FIG. 5B are performed.

When the application installation package of the to-be-downloaded APP is not installed in the terminal, S303 in FIG. 9A is performed: The management module determines, based on the identifier of the application installation package of the to-be-downloaded APP, a networking profile required for downloading the application installation package corresponding to the identifier of the application installation package. The process in which the management module determines, based on the identifier of the application installation package of the to-be-downloaded APP, the networking profile required for downloading the application installation package is the same as the process of S103 in FIG. 3 in which the terminal determines the first networking profile based on the identifier of the to-be-downloaded data. For brevity, details are not described again herein.

After the management module determines the networking profile, the management module performs networking with the server based on the determined networking profile, obtains authentication information in the secure element, and then performs two-way authentication between the server and the secure element. This embodiment is described still by using an example in which a networking profile and authentication information in an installed application installation package are obtained. In this embodiment, the process of two-way authentication between the server and the secure element is the same as the process of two-way authentication between the server and the secure element in FIG. 8A and FIG. 8B. For brevity, details are not described again herein. To be specific, the process of S309 to S317 in FIG. 9B is the same as the process of S209 to S217 in FIG. 8B.

When the management module downloads and installs the application installation package of the to-be-downloaded APP, the management module downloads the APP by using a profile in the downloaded application installation package of the to-be-downloaded APP, that is, S318 is performed. A specific implementation process of S318 may be:

the terminal sends a fourth message to the server, where the fourth message includes an identifier of the to-be-downloaded APP; and the terminal receives a fifth message sent by the server, where the fifth message includes the APP corresponding to the identifier of the to-be-downloaded APP.

Optionally, the terminal installs the data in the application installation package of the to-be-downloaded APP.

It should be noted that the process of 301 and S302 in FIG. 9A is the same as the process of S201 and S202 in FIG. 8A. For brevity, details are not described again.

An implementation of this application further provides a data downloading method. The method is applicable to a secure element, and the secure element is included in a terminal. The downloading method includes:

the secure element sends a preconfigured at least one networking profile to a management module of the terminal, where the at least one networking profile is used by the management module for networking, and obtaining data based on information obtained by the management module about to-be-downloaded data, where the data corresponds to an identifier of the to-be-downloaded data that is included in the information about the to-be-downloaded data;

the secure element receives the data sent by the management module; and the secure element installs the data.

In a possible implementation, at least one networking profile is pre-provisioned in at least one of an installed application installation package or a primary platform of the secure element.

Figure 10:
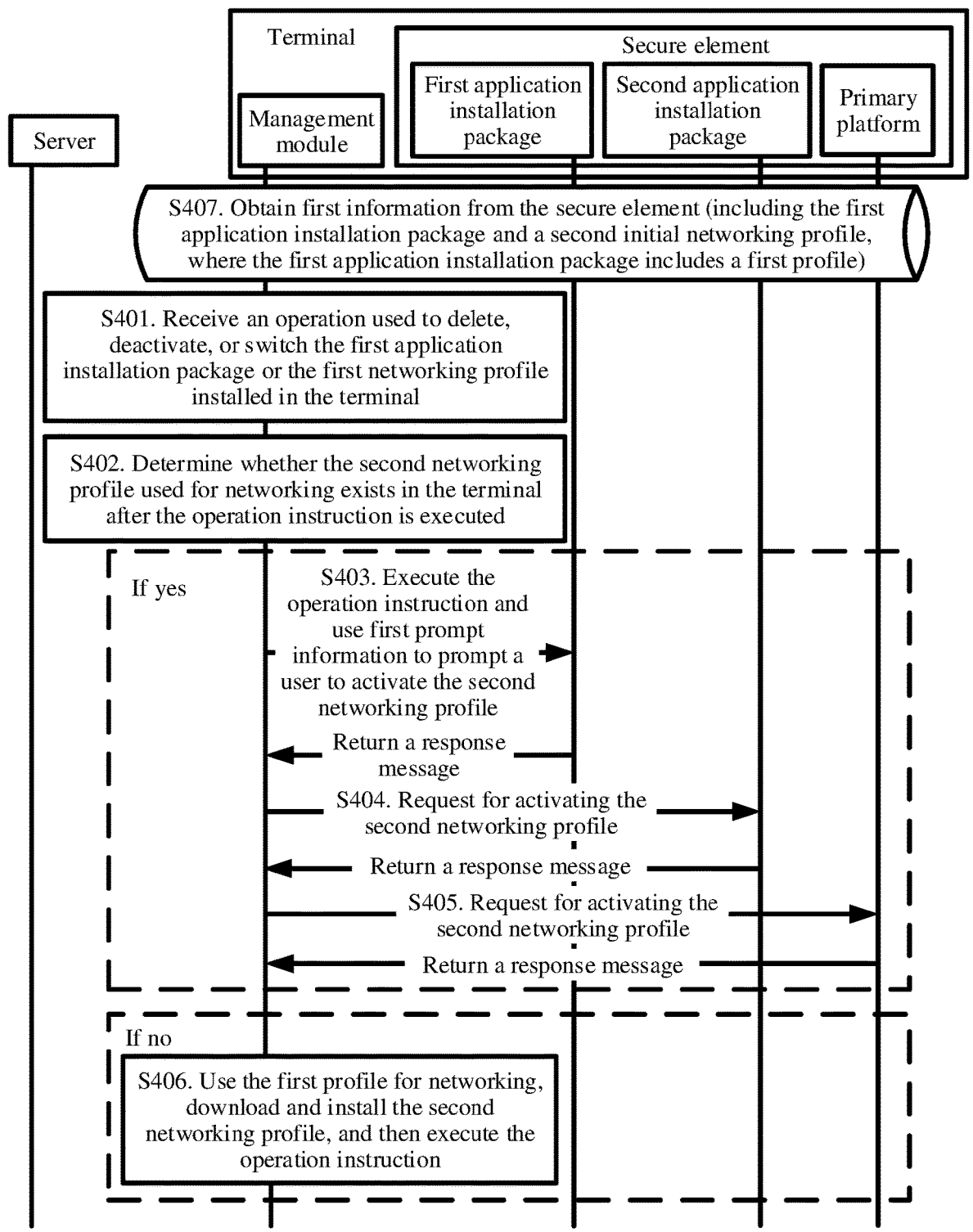
FIG. 10 is a schematic flowchart of a data management method according to an embodiment of this application.

FIG. 10 is a method for managing data in a terminal according to an embodiment of this application. As shown in FIG. 10, the method is performed by a management module, and the method may include the following steps.

S401. The management module receives an operation instruction.

Optionally, in an embodiment, the management module may receive the operation instruction in the following manner.

The management module receives the operation instruction entered by a user, or the management module receives an operation instruction sent by a server. The server may also be referred to as a management platform. The management platform may be an installation package download server, a management server deployed by a terminal manufacturer, a management server deployed by a service provider, or the like.

The operation instruction may include a deletion instruction, a deactivation instruction, or a switch instruction. The operation instruction includes an identifier of a first application installation package or an identifier of a first networking profile. The operation instruction is used to manage the first application installation package or the first networking profile installed in the terminal. The first networking profile is a network access application (Network Access Application, NAA) required for connecting to a network, for example, a provisioning profile PP or an operation profile (operation profile).

S402. The management module determines whether a second networking profile used for networking exists in the terminal after the operation instruction is executed.

The management module determines, based on the identifier of the first application installation package or the identifier of the first networking profile, and an application installation package or a networking profile installed in the terminal, whether the second networking profile is available.

For example, when the operation instruction is an instruction for deleting an activated bundle, deactivating an activated bundle, or switching from an activated bundle 1 to a bundle 2, the management module determines whether a subscribed networking profile exists in the bundle 2 after the operation instruction is executed, and if yes, further determines whether a networking profile is available in the bundle or whether a networking profile is available in a primary platform.

S403. When the second networking profile used for networking exists in the terminal after the operation instruction is executed, the management module executes the operation instruction and activates the second networking profile.

Optionally, the second networking profile is pre-provisioned in a second application installation package in a secure element, or the second networking profile is pre-provisioned in a primary platform of a secure element.

The management module executes the operation instruction and sends an activation request to the second application installation package of the second networking profile, to activate the second networking profile. For example, when the second networking profile is a networking profile in the bundle 2, the management module sends an activation request to the bundle 2, and the second networking profile in the bundle 2 is activated.

In this solution, the management module determines an operation based on an installation status of the networking profile in the application installation package. In this way, an unintentional user operation that makes networking impossible and further makes it impossible to download an application is avoided, terminal networking is ensured, and user experience is improved.

Optionally, in this embodiment of this application, after the management module executes the operation instruction, the method further includes:

S404. The management module sends an activation request to the second application installation package of the second profile, where the activation request is used to activate the second profile in the second application installation package; or S405. The management module sends an activation request to the primary platform of the terminal, where the activation request is used to activate the second profile in the primary platform.

Optionally, in this embodiment of this application, the method further includes:

the management module generates first prompt information, where the first prompt information is information about the second profile used for networking after the operation instruction is executed, and the first prompt information may display the information about the second profile to the user by using a display of the terminal, so that the user uses the second profile for networking.

Optionally, in this embodiment of this application, the method further includes:

S406. When the second networking profile used for networking does not exist in the terminal after the operation instruction is executed, the management module uses the first profile for networking, and downloads and installs the second networking profile; and the management module executes the operation instruction.

Optionally, in this embodiment of this application, the method further includes:

the management module generates second prompt information, where the second prompt information is information for downloading the second profile by using the first profile before the operation instruction is executed, and the second prompt information may be displayed to the user by using the display of the terminal and prompt the user to obtain, by using a networking profile already used for networking, an available networking profile before the operation instruction is executed, to avoid that it is impossible to connect to a network after a deletion or deactivation operation instruction is executed.

Optionally, in this embodiment of this application, after the management module receives the operation instruction, the method further includes: the management module determines whether the operation instruction can be executed.

After receiving the operation instruction, the management module determines whether the operation instruction can be executed for a target application installation package, that is, the first application installation package. For example, the management module determines whether the target application installation package includes a rule forbidding execution of the operation instruction, for example, forbidding an operation such as forbidding deleting the target application installation package, forbidding deactivating a networking profile in the target application installation package, or forbidding switching a networking profile in the target application installation package.

Optionally, in this embodiment of this application, before the management module determines whether the second networking profile used for networking exists in the terminal after the operation instruction is executed, the method further includes:

S407. The management module obtains first information from the secure element, where the first information includes the first application installation package and the second networking profile, and the first application installation package includes the first profile.

The data downloading method and the data management method are described in FIG. 3 to FIG. 10. With reference to FIG. 11 to FIG. 16, the following describes a terminal, a management module, and a secure element provided by the embodiments of this application.

Figure 11:
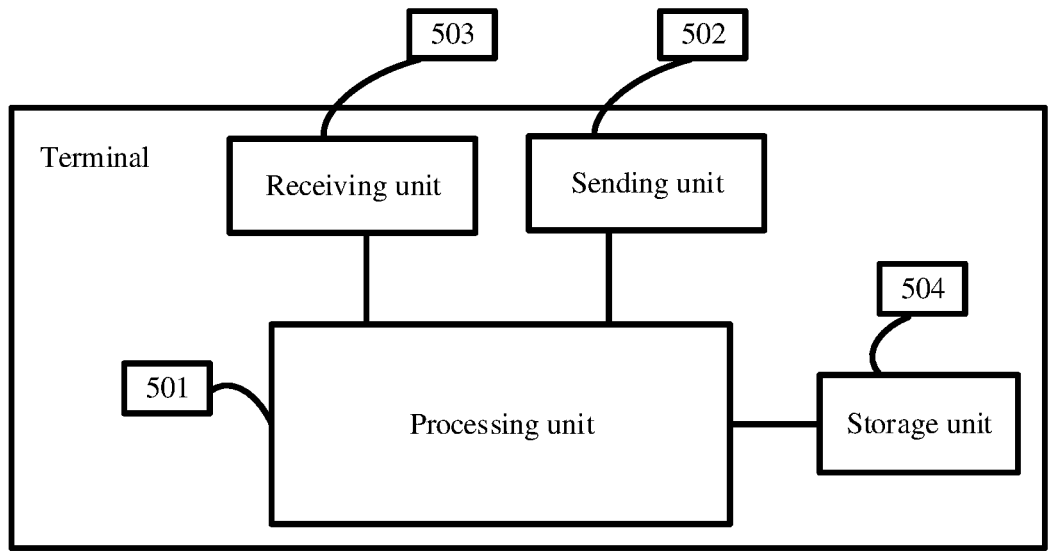
FIG. 11 is a schematic structural diagram of a terminal according to an embodiment of this application.

FIG. 11 is a schematic structural diagram of a terminal according to an embodiment of this application. As shown in FIG. 11, the terminal may include a processing unit 501, a sending unit 502, and a processing unit 503.

The processing unit 501 is configured to obtain first information pre-provisioned in the terminal, where the first information includes at least one networking profile.

The processing unit 501 is further configured to obtain information about to-be-downloaded data, where the information about the to-be-downloaded data includes an identifier of the to-be-downloaded data.

The processing unit 501 is further configured to determine a first networking profile based on the identifier of the to-be-downloaded data, where the first networking profile is included in the at least one networking profile, and the first networking profile is used by the terminal for networking.

The sending unit 502 is configured to send a first message to a server, where the first message includes the identifier of the to-be-downloaded data.

The receiving unit 503 is configured to receive a second message sent by the server, where the second message includes data corresponding to the identifier of the to-be-downloaded data.

By using the data downloading method, the at least one networking profile is pre-provisioned in the terminal, and when the terminal downloads the to-be-downloaded data, networking is performed by using the pre-provisioned at least one networking profile, thereby implementing downloading of the to-be-downloaded data. Therefore, a technical problem in the prior art that a networking profile is pre-provisioned in a default bundle and the networking profile is suitable only for downloading APPs in the default bundle and unsuitable for downloading other bundles or APPs in other bundles is avoided.

In a possible embodiment, that the processing unit 501 determines a first networking profile based on the identifier of the to-be-downloaded data includes:

when the at least one networking profile includes a networking profile required for downloading the data, the processing unit uses the networking profile as the first networking profile.

In another possible embodiment, at least one networking profile is pre-provisioned in at least one of an installed application installation package and a primary platform of the terminal.

In a possible embodiment, that the processing unit 501 determines a first networking profile based on the identifier of the to-be-downloaded data includes:

when at least one networking profile is pre-provisioned in the installed application installation package, and the at least one networking profile includes a networking profile required for downloading the data, the processing unit 501 uses the networking profile as the first networking profile.

In a possible embodiment, when the at least one networking profile is pre-provisioned in the installed application installation package, and the at least one networking profile does not include the networking profile required for downloading the data, the processing unit 501 uses at least one networking profile pre-provisioned in the primary platform as the first networking profile.

In a possible embodiment, when the at least one networking profile is not pre-provisioned in the installed application installation package, the processing unit 501 uses the at least one networking profile pre-provisioned in the primary platform as the first networking profile.

In a possible embodiment, the first information further includes at least one piece of authentication information; the information about the to-be-downloaded data further includes a public key identifier of a certificate issuer CI; and the processing unit 501 is further configured to determine, from the at least one piece of authentication information, first authentication information corresponding to the public key identifier of the CI, where the first authentication information is used for two-way authentication between the terminal and the server.

In a possible embodiment, that the processing unit 501 determines, from the at least one piece of authentication information, first authentication information corresponding to the public key identifier of the CI includes:

when the at least one piece of authentication information includes authentication information corresponding to the public key identifier of the CI, the processing unit 501 uses the authentication information corresponding to the public key identifier of the CI as the first authentication information.

In a possible embodiment, at least one piece of authentication information is pre-provisioned in at least one of the installed application installation package and the primary platform of the terminal.

In a possible embodiment, that the processing unit 501 determines, from the at least one piece of authentication information, first authentication information corresponding to the public key identifier of the CI includes:

when at least one piece of authentication information is pre-provisioned in the installed application installation package, and the at least one piece of authentication information includes the authentication information corresponding to the public key identifier of the CI, the processing unit 501 uses the authentication information as the first authentication information.

In a possible embodiment, that the processing unit 501 determines, from the at least one piece of authentication information, first authentication information corresponding to the public key identifier of the CI includes:

when the at least one piece of authentication information is pre-provisioned in the installed application installation package, and the at least one piece of authentication information does not include the authentication information corresponding to the public key identifier of the CI, the processing unit 501 uses at least one piece of authentication information pre-provisioned in the primary platform as the first authentication information.

In a possible embodiment, when the at least one piece of authentication information is not pre-provisioned in the installed application installation package, the processing unit 501 uses the at least one piece of authentication information pre-provisioned in the primary platform as the first authentication information.

In an embodiment, when the to-be-downloaded data is an application installation package, the identifier of the to-be-downloaded data is an identifier of the application installation package. Optionally, when the to-be-downloaded data is an APP, the identifier of the to-be-downloaded data is an identifier of the APP, and the information about the to-be-downloaded data further includes an identifier of an application installation package of the APP; and that the processing unit 501 determines a first networking profile based on the identifier of the to-be-downloaded data includes:

when the application installation package corresponding to the identifier of the application installation package is installed in the terminal, and no available first networking profile exists in the application installation package of the APP, the processing unit 501 determines the first networking profile based on the identifier of the to-be-downloaded data. In an embodiment, when the to-be-downloaded data is the APP, the identifier of the to-be-downloaded data is the identifier of the APP, and the information about the to-be-downloaded data further includes the identifier of the application installation package of the APP;

when the application installation package corresponding to the identifier of the application installation package is not installed in the terminal, that the sending unit 502 sends a first message to a server includes:

the sending unit 502 sends the first message to the server, where the first message includes the identifier of the application installation package of the APP;

that the receiving unit 503 receives a second message sent by the server, where the second message includes data corresponding to the identifier of the to-be-downloaded data, includes:

the receiving unit 503 receives the second message sent by the server, where the second message includes data corresponding to the identifier of the application installation package of the APP, and the receiving unit 503 installs the data in the primary platform of the terminal;

the sending unit 502 sends a third message to the server, where the third message includes the identifier of the APP; and the receiving unit 503 receives a fourth message sent by the server, where the fourth message includes data corresponding to the identifier of the APP.

In an embodiment, when the to-be-downloaded data is the APP, the identifier of the to-be-downloaded data is the identifier of the APP, and the information about the to-be-downloaded data further includes the identifier of the application installation package of the APP;

when the application installation package corresponding to the identifier of the application installation package is not installed in the terminal, that the sending unit 502 sends a first message to a server includes:

the sending unit 502 sends the first message to the server, where the first message includes the identifier of the application installation package of the APP and the identifier of the APP; and that the receiving unit 503 receives a second message sent by the server, where the second message includes data corresponding to the identifier of the to-be-downloaded data, includes:

the receiving unit 503 receives the second message sent by the server, where the second message includes the application installation package corresponding to the identifier of the application installation package of the APP and the APP corresponding to the identifier of the APP.

Optionally, in this embodiment of this application, the terminal may further include a storage unit 504, where the storage unit is configured to store data, for example, the preconfigured at least one networking profile.

Functions of the units of the terminal may be implemented by the steps performed by the terminal in the embodiments shown in FIG. 3 to FIG. 7, and a same technical effect is achieved. A specific working process of the terminal is not described again herein.

Figure 12:
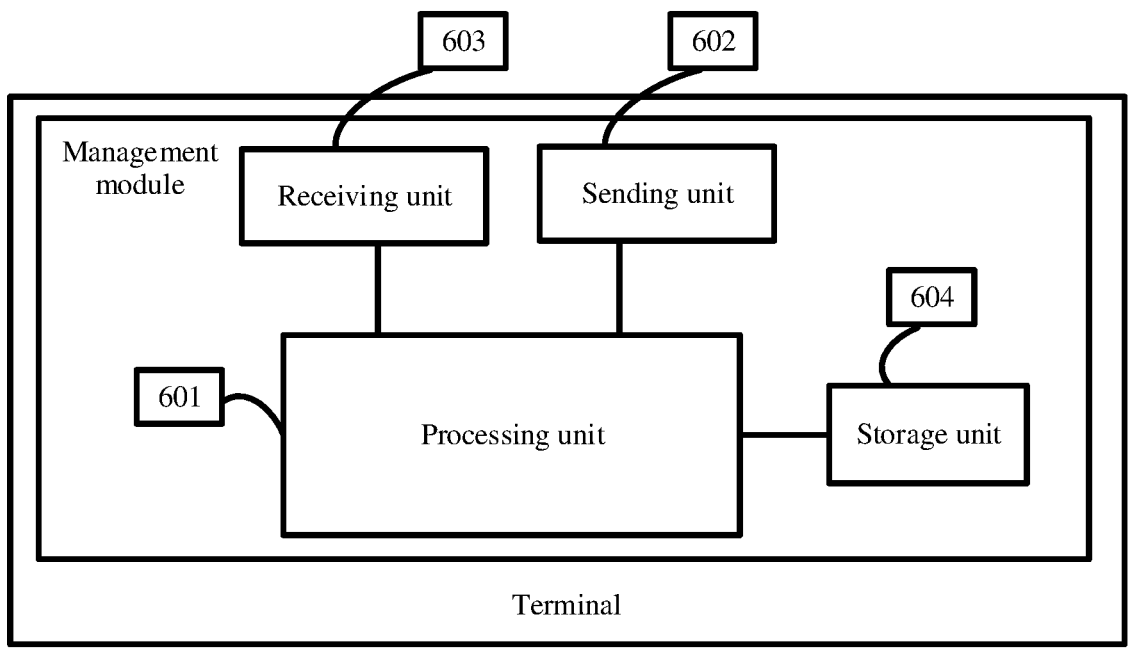
FIG. 12 is a schematic structural diagram of a management module according to an embodiment of this application.

FIG. 12 is a schematic structural diagram of a management apparatus according to an embodiment of this application. The management apparatus is included in a terminal. The management apparatus may include a processing unit 601, a sending unit 602, and a processing unit 603.

The processing unit 601 is configured to obtain first information pre-provisioned in the terminal, where the first information includes at least one networking profile.

The processing unit 601 is further configured to obtain information about to-be-downloaded data, where the information about the to-be-downloaded data includes an identifier of the to-be-downloaded data.

The processing unit 601 is further configured to determine a first networking profile based on the identifier of the to-be-downloaded data, where the first networking profile is included in the at least one networking profile, and the first networking profile is used by the terminal for networking.

The sending unit 602 is configured to send a first message to a server, where the first message includes the identifier of the to-be-downloaded data.

The receiving unit 602 is configured to receive a second message sent by the server, where the second message includes data corresponding to the identifier of the to-be-downloaded data.

By using the data downloading method, the at least one networking profile is pre-provisioned in the terminal, and when the management apparatus downloads the to-be-downloaded data, networking is performed by using the pre-provisioned at least one networking profile, thereby implementing downloading of the to-be-downloaded data. Therefore, a technical problem in the prior art that a networking profile is pre-provisioned in a default bundle and the networking profile is suitable only for downloading APPs in the default bundle and unsuitable for downloading other bundles or APPs in other bundles is avoided.

In a possible embodiment, that the processing unit 601 determines a first networking profile based on the identifier of the to-be-downloaded data includes:

when the at least one networking profile includes a networking profile required for downloading the data, the processing unit uses the networking profile as the first networking profile.

In another possible embodiment, at least one networking profile is pre-provisioned in at least one of an installed application installation package and a primary platform of the terminal.

In a possible embodiment, that the processing unit 601 determines a first networking profile based on the identifier of the to-be-downloaded data includes:
when at least one networking profile is pre-provisioned in the installed application installation package, and the at least one networking profile includes a networking profile required for downloading the data, the processing unit 601 uses the networking profile as the first networking profile.

In a possible embodiment, that the processing unit 601 determines a first networking profile based on the identifier of the to-be-downloaded data includes:
when the at least one networking profile is pre-provisioned in the installed application installation package, and the at least one networking profile does not include the networking profile required for downloading the data, the processing unit 601 uses at least one networking profile pre-provisioned in the primary platform as the first networking profile.

In a possible embodiment, when the at least one networking profile is not pre-provisioned in the installed application installation package, the processing unit 601 uses the at least one networking profile pre-provisioned in the primary platform as the first networking profile.

In a possible embodiment, the first information further includes at least one piece of authentication information; the information about the to-be-downloaded data further includes a public key identifier of a certificate issuer CI; and the downloading method further includes:
the processing unit 601 determines, from the at least one piece of authentication information, first authentication information corresponding to the public key identifier of the CI, where the first authentication information is used for two-way authentication between the terminal and the server.

In a possible embodiment, that the processing unit 601 determines, from the at least one piece of authentication information, first authentication information corresponding to the public key identifier of the CI includes:
when the at least one piece of authentication information includes authentication information corresponding to the public key identifier of the CI, the processing unit 601 uses the authentication information corresponding to the public key identifier of the CI as the first authentication information.

In a possible embodiment, at least one piece of authentication information is pre-provisioned in at least one of the installed application installation package and the primary platform of the terminal.

In a possible embodiment, that the processing unit 601 determines, from the at least one piece of authentication information, first authentication information corresponding to the public key identifier of the CI includes:
when at least one piece of authentication information is pre-provisioned in the installed application installation package, and the at least one piece of authentication information includes the authentication information corresponding to the public key identifier of the CI, the processing unit 601 uses the authentication information as the first authentication information.

In a possible embodiment, that the processing unit 601 determines, from the at least one piece of authentication information, first authentication information corresponding to the public key identifier of the CI includes:
when the at least one piece of authentication information is pre-provisioned in the installed application installation package, and the at least one piece of authentication information does not include the authentication information corresponding to the public key identifier of the CI, the processing unit 601 uses at least one piece of authentication information pre-provisioned in the primary platform as the first authentication information.

In a possible embodiment, when the at least one piece of authentication information is not pre-provisioned in the installed application installation package, the processing unit 601 uses the at least one piece of authentication information pre-provisioned in the primary platform as the first authentication information.

In an embodiment, when the to-be-downloaded data is an application installation package, the identifier of the to-be-downloaded data is an identifier of the application installation package. Optionally, when the to-be-downloaded data is an APP, the identifier of the to-be-downloaded data is an identifier of the APP, and the information about the to-be-downloaded data further includes an identifier of an application installation package of the to-be-downloaded APP; and that the processing unit 601 determines a first networking profile based on the identifier of the to-be-downloaded data includes:
when the application installation package corresponding to the identifier of the application installation package is installed in the terminal, and no available first networking profile exists in the application installation package of the APP, the processing unit 601 determines the first networking profile based on the identifier of the to-be-downloaded data. In an embodiment, when the to-be-downloaded data is the APP, the identifier of the to-be-downloaded data is the identifier of the APP, and the information about the to-be-downloaded data further includes the identifier of the application installation package of the APP;

when the application installation package corresponding to the identifier of the application installation package is not installed in the terminal, that the sending unit 602 sends a first message to a server includes:
the sending unit 602 sends the first message to the server, where the first message includes the identifier of the application installation package of the APP;
that the receiving unit 603 receives a second message sent by the server, where the second message includes data corresponding to the identifier of the to-be-downloaded data, includes:
the receiving unit 603 receives the second message sent by the server, where the second message includes data corresponding to the identifier of the application installation package of the APP, and the receiving unit 603 installs the data in the primary platform of the terminal;
the sending unit 602 sends a third message to the server, where the third message includes the identifier of the APP; and
the receiving unit 603 receives a fourth message sent by the server, where the fourth message includes data corresponding to the identifier of the APP.

Optionally, in an embodiment, the processing unit 601 is further configured to install the data in the application installation package of the APP.

In an embodiment, when the to-be-downloaded data is the APP, the identifier of the to-be-downloaded data is the identifier of the APP, and the information about the to-be-downloaded data further includes the identifier of the application installation package of the APP;

when the application installation package corresponding to the identifier of the application installation package is not installed in the terminal, that the sending unit 602 sends a first message to a server includes:

the sending unit 602 sends the first message to the server, where the first message includes the identifier of the application installation package of the APP and the identifier of the APP; and that the receiving unit 603 receives a second message sent by the server, where the second message includes data corresponding to the identifier of the to-be-downloaded data, includes:

the receiving unit 603 receives the second message sent by the server, where the second message includes the application installation package corresponding to the identifier of the application installation package of the APP and the APP corresponding to the identifier of the APP.

Functions of the units of the terminal may be implemented by the steps performed by the management apparatus in the embodiments shown in FIG. 8A, FIG. 8B, FIG. 9A, and FIG. 9B, and a same technical effect is achieved. A specific working process of the management apparatus is not described again herein.

Figure 13:
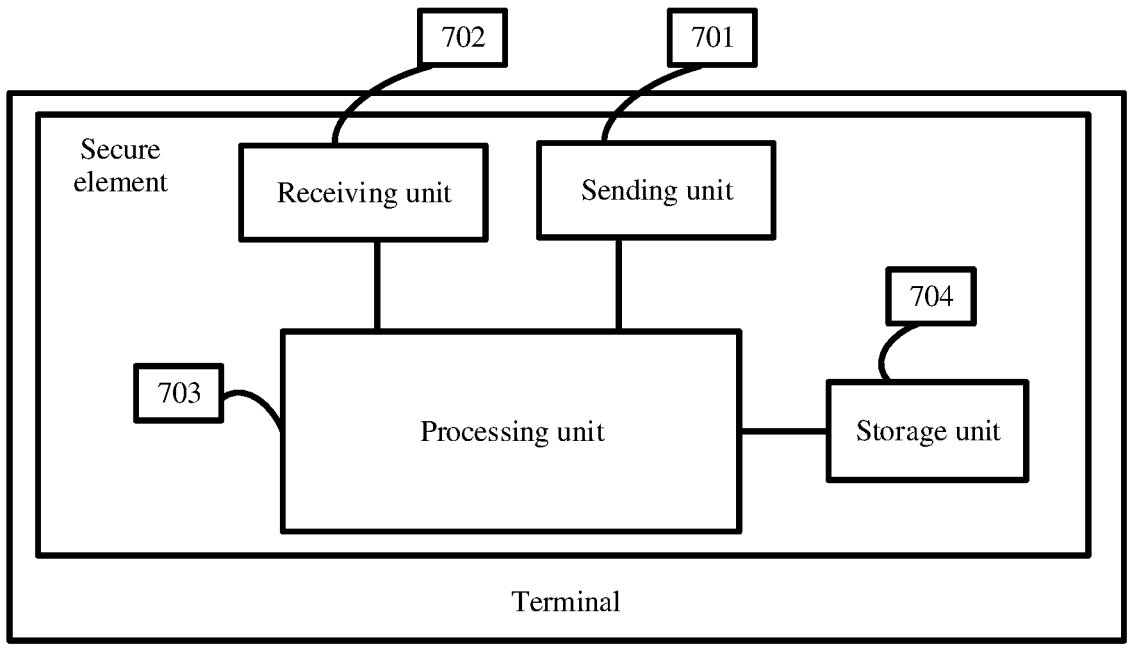
FIG. 13 is a schematic structural diagram of a secure element according to an embodiment of this application.

FIG. 13 is a schematic structural diagram of a secure element according to an embodiment of this application. As shown in FIG. 13, the secure element may include:

a sending unit 701, configured to send a preconfigured at least one networking profile to a management apparatus of a terminal, where the at least one networking profile is used by the management apparatus for networking, and obtaining data based on information obtained by the management apparatus about to-be-downloaded data, where the data corresponds to an identifier of the to-be-downloaded data that is included in the information about the to-be-downloaded data;

a receiving unit 702, configured to receive the data sent by the management apparatus; and a processing unit 703, configured to install the data.

In a possible implementation, at least one networking profile is pre-provisioned in at least one of an installed application installation package or a primary platform of the secure element.

Optionally, in this embodiment of this application, the terminal may further include a storage unit 704, where the storage unit is configured to store data, for example, the preconfigured at least one networking profile.

An embodiment of this application further provides a management apparatus. As shown in FIG. 12, the management apparatus includes a receiving unit 503, configured to receive an operation instruction, where the operation instruction includes a deletion instruction, a deactivation instruction, or a switch instruction, the operation instruction includes an identifier of a first application installation package or an identifier of a first networking profile, and the operation instruction is used to manage the first application installation package or the first networking profile installed in a terminal; and a processing unit 501, configured to determine whether a second networking profile used for networking exists in the terminal after the operation instruction is executed, where when the second networking profile used for networking exists in the terminal, the processing unit 501 executes the operation instruction and activates the second networking profile.

In an embodiment, a sending unit 502 is further configured to send an activation request to a second application installation package of a second profile, where the activation request is used to activate the second networking profile in the second application installation package; or a sending unit 502 is further configured to send an activation request to a primary platform of the terminal, where the activation request is used to activate a second networking profile in the primary platform.

In an embodiment, er configured to generate first prompt information, where the first prompt information is information about the second networking profile used for networking after the operation instruction is executed.

In an embodiment, when the second networking profile used for networking does not exist in the terminal after the operation instruction is executed, the processing unit 501 uses the first networking profile for networking, and downloads and installs the second networking profile; and when the downloading and installation of the second networking profile are complete, the processing unit 502 executes the operation instruction.

In an embodiment, the processing unit 501 is further configured to generate second prompt information, where the second prompt information is information for downloading and installing the second networking profile by using the first profile before the operation instruction is executed.

In an embodiment, the processing unit 501 is further configured to determine whether the operation instruction can be executed.

In an embodiment, that the receiving unit 503 receives an operation instruction includes:

the receiving unit 503 receives an operation instruction entered by a user; or in another embodiment, that the receiving unit 503 receives an operation instruction includes: the receiving unit 503 receives an operation instruction sent by a server.

In an embodiment, the processing unit 501 is further configured to obtain first information in the terminal, where the first information includes the installed first application installation package and first networking profile.

Optionally, in an embodiment, the second networking profile is pre-provisioned in the second application installation package installed in the terminal or the second networking profile is pre-provisioned in the primary platform of the terminal.

Figure 14:
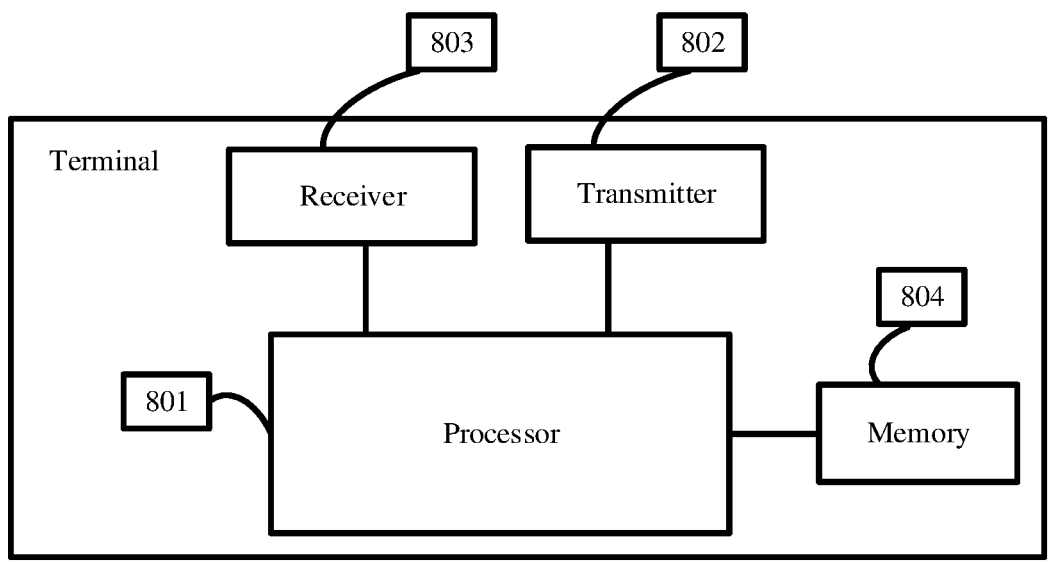
FIG. 14 is a schematic structural diagram of another terminal according to an embodiment of this application.

FIG. 14 is a schematic structural diagram of a terminal according to an embodiment of this application. As shown in FIG. 14, the terminal may include a processor 801, a transmitter 802, and a processor 803.

The processor 801 is configured to obtain first information pre-provisioned in the terminal, where the first information includes at least one networking profile.

The processor 801 is further configured to obtain information about to-be-downloaded data, where the information about the to-be-downloaded data includes an identifier of the to-be-downloaded data.

The processor 801 is further configured to determine a first networking profile based on the identifier of the to-bedownloaded data, where the first networking profile is included in the at least one networking profile, and the first networking profile is used by the terminal for networking.

The transmitter 802 is configured to send a first message to a server, where the first message includes the identifier of the to-be-downloaded data.

The receiver 803 is configured to receive a second message sent by the server, where the second message includes data corresponding to the identifier of the to-be-downloaded data.

By using the data downloading method, the at least one networking profile is pre-provisioned in the terminal, and when the terminal downloads the to-be-downloaded data, networking is performed by using the pre-provisioned at least one networking profile, thereby implementing downloading of the to-be-downloaded data. Therefore, a technical problem in the prior art that a networking profile is pre-provisioned in a default bundle and the networking profile is suitable only for downloading APPs in the default bundle and unsuitable for downloading other bundles or APPs in other bundles is avoided.

In a possible embodiment, that the processor 801 determines a first networking profile based on the identifier of the to-be-downloaded data includes:
when the at least one networking profile includes a networking profile required for downloading the data, the processor uses the networking profile as the first networking profile.

In another possible embodiment, at least one networking profile is pre-provisioned in at least one of an installed application installation package and a primary platform of the terminal.

In a possible embodiment, that the processor 801 determines a first networking profile based on the identifier of the to-be-downloaded data includes:
when at least one networking profile is pre-provisioned in the installed application installation package, and the at least one networking profile includes a networking profile required for downloading the data, the processor 801 uses the networking profile as the first networking profile.

In a possible embodiment, when the at least one networking profile is pre-provisioned in the installed application installation package, and the at least one networking profile does not include the networking profile required for downloading the data, the processor 801 uses at least one networking profile pre-provisioned in the primary platform as the first networking profile.

In a possible embodiment, when the at least one networking profile is not pre-provisioned in the installed application installation package, the processor 801 uses the at least one networking profile pre-provisioned in the primary platform as the first networking profile.

In a possible embodiment, the first information further includes at least one piece of authentication information; the information about the to-be-downloaded data further includes a public key identifier of a certificate issuer CI; and
the processor 801 is further configured to determine, from the at least one piece of authentication information, first authentication information corresponding to the public key identifier of the CI, where the first authentication information is used for two-way authentication between the terminal and the server.

In a possible embodiment, that the processor 801 determines, from the at least one piece of authentication information, first authentication information corresponding to the public key identifier of the CI includes:
when the at least one piece of authentication information includes authentication information corresponding to the public key identifier of the CI, the processor 801 uses the authentication information corresponding to the public key identifier of the CI as the first authentication information.

In a possible embodiment, at least one piece of authentication information is pre-provisioned in at least one of the installed application installation package and the primary platform of the terminal.

In a possible embodiment, that the processor 801 determines, from the at least one piece of authentication information, first authentication information corresponding to the public key identifier of the CI includes:
when at least one piece of authentication information is pre-provisioned in the installed application installation package, and the at least one piece of authentication information includes the authentication information corresponding to the public key identifier of the CI, the processor 801 uses the authentication information as the first authentication information.

In a possible embodiment, that the processor 801 determines, from the at least one piece of authentication information, first authentication information corresponding to the public key identifier of the CI includes:
when the at least one piece of authentication information is pre-provisioned in the installed application installation package, and the at least one piece of authentication information does not include the authentication information corresponding to the public key identifier of the CI, the processor 801 uses at least one piece of authentication information pre-provisioned in the primary platform as the first authentication information.

In a possible embodiment, when the at least one piece of authentication information is not pre-provisioned in the installed application installation package, the processor 801 uses the at least one piece of authentication information pre-provisioned in the primary platform as the first authentication information.

In an embodiment, when the to-be-downloaded data is an application installation package, the identifier of the to-be-downloaded data is an identifier of the application installation package.

Optionally, when the to-be-downloaded data is an APP, the identifier of the to-be-downloaded data is an identifier of the APP, and the information about the to-be-downloaded data further includes an identifier of an application installation package of the APP; and
that the processor 801 determines a first networking profile based on the identifier of the to-be-downloaded data includes:
when the application installation package corresponding to the identifier of the application installation package is installed in the terminal, and no available first networking profile exists in the application installation package of the APP, the processor 801 determines the first networking profile based on the identifier of the to-be-downloaded data. In an embodiment, when the to-be-downloaded data is the APP, the identifier of the to-be-downloaded data is the identifier of the APP, and the information about the to-be-downloaded data further includes the identifier of the application installation package of the APP;
when the application installation package corresponding to the identifier of the application installation package is not installed in the terminal, that the transmitter 802 sends a first message to a server includes:

the transmitter 802 sends the first message to the server, where the first message includes the identifier of the application installation package of the APP;

that the receiver 803 receives a second message sent by the server, where the second message includes data corresponding to the identifier of the to-be-downloaded data, includes:

the receiver 803 receives the second message sent by the server, where the second message includes data corresponding to the identifier of the application installation package of the APP, and the receiver 803 installs the data in the primary platform of the terminal;

the transmitter 802 sends a third message to the server, where the third message includes the identifier of the APP; and the receiver 803 receives a fourth message sent by the server, where the fourth message includes data corresponding to the identifier of the APP.

In an embodiment, when the to-be-downloaded data is the APP, the identifier of the to-be-downloaded data is the identifier of the APP, and the information about the to-be-downloaded data further includes the identifier of the application installation package of the APP;

when the application installation package corresponding to the identifier of the application installation package is not installed in the terminal, that the transmitter 802 sends a first message to a server includes:

the transmitter 802 sends the first message to the server, where the first message includes the identifier of the application installation package of the APP and the identifier of the APP; and that the receiver 803 receives a second message sent by the server, where the second message includes data corresponding to the identifier of the to-be-downloaded data, includes:

the receiver 803 receives the second message sent by the server, where the second message includes the application installation package corresponding to the identifier of the application installation package of the APP and the APP corresponding to the identifier of the APP.

Optionally, in this embodiment of this application, the terminal may further include a memory 804, where the memory is configured to store data, for example, the pre-configured at least one networking profile.

For implementations and beneficial effects of the components of the terminal in resolving problems in the foregoing embodiment, refer to implementations and beneficial effects of the methods shown in FIG. 3 to FIG. 7. Details are not described again herein.

Figure 15:
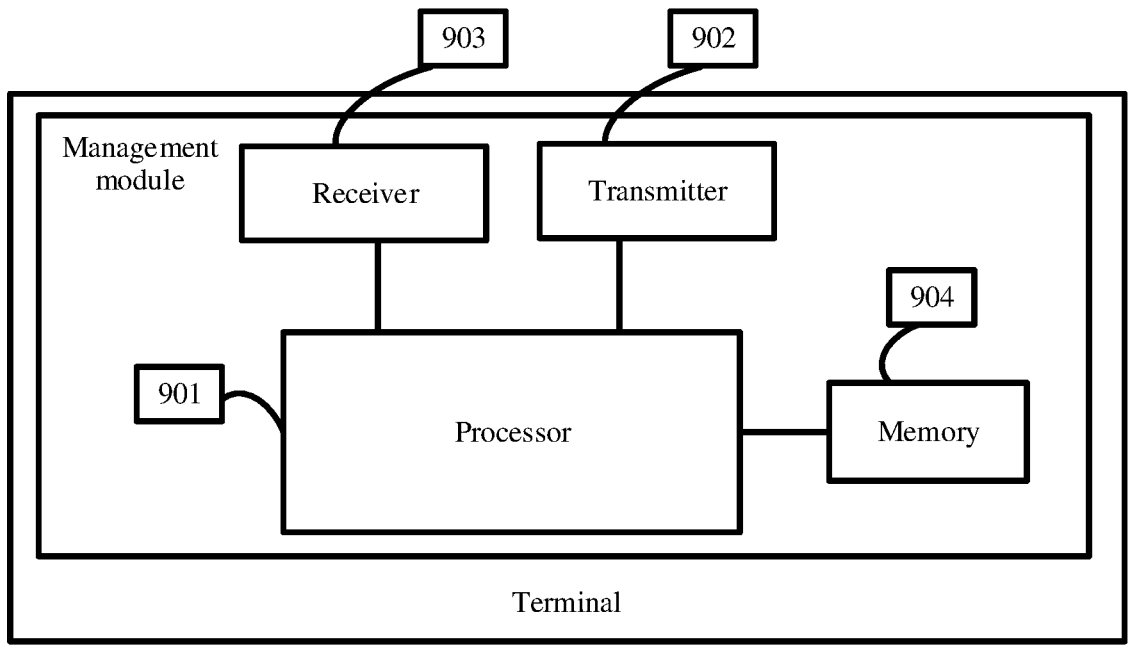
FIG. 15 is a schematic structural diagram of another management module according to an embodiment of this application.

FIG. 15 is a schematic structural diagram of a management apparatus according to an embodiment of this application. The management apparatus is included in a terminal. As shown in FIG. 15, the management apparatus may include a processor 901, a transmitter 902, and a processor 903.

The processor 901 is configured to obtain first information pre-provisioned in the terminal, where the first information includes at least one networking profile.

The processor 901 is further configured to obtain information about to-be-downloaded data, where the information about the to-be-downloaded data includes an identifier of the to-be-downloaded data.

The processor 901 is further configured to determine a first networking profile based on the identifier of the to-be-downloaded data, where the first networking profile is included in the at least one networking profile, and the first networking profile is used by the terminal for networking.

The transmitter 902 is configured to send a first message to a server, where the first message includes the identifier of the to-be-downloaded data.

The receiver 902 is configured to receive a second message sent by the server, where the second message includes data corresponding to the identifier of the to-be-downloaded data.

By using the data downloading method, the at least one networking profile is pre-provisioned in the terminal, and when the management apparatus downloads the to-be-downloaded data, networking is performed by using the pre-provisioned at least one networking profile, thereby implementing downloading of the to-be-downloaded data. Therefore, a technical problem in the prior art that a networking profile is pre-provisioned in a default bundle and the networking profile is suitable only for downloading APPs in the default bundle and unsuitable for downloading other bundles or APPs in other bundles is avoided.

In a possible embodiment, that the processor 901 determines a first networking profile based on the identifier of the to-be-downloaded data includes:

when the at least one networking profile includes a networking profile required for downloading the data, the processor uses the networking profile as the first networking profile.

In another possible embodiment, at least one networking profile is pre-provisioned in at least one of an installed application installation package and a primary platform of the terminal.

In a possible embodiment, that the processor 901 determines a first networking profile based on the identifier of the to-be-downloaded data includes:

when at least one networking profile is pre-provisioned in the installed application installation package, and the at least one networking profile includes a networking profile required for downloading the data, the processor 901 uses the networking profile as the first networking profile.

In a possible embodiment, that the processor 901 determines a first networking profile based on the identifier of the to-be-downloaded data includes:

when the at least one networking profile is pre-provisioned in the installed application installation package, and the at least one networking profile does not include the networking profile required for downloading the data, the processor 901 uses at least one networking profile pre-provisioned in the primary platform as the first networking profile.

In a possible embodiment, when the at least one networking profile is not pre-provisioned in the installed application installation package, the processor 901 uses the at least one networking profile pre-provisioned in the primary platform as the first networking profile.

In a possible embodiment, the first information further includes at least one piece of authentication information; the information about the to-be-downloaded data further includes a public key identifier of a certificate issuer CI; and the downloading method further includes:

the processor 901 determines, from the at least one piece of authentication information, first authentication information corresponding to the public key identifier of the CI, where the first authentication information is used for two-way authentication between the terminal and the server.

In a possible embodiment, that the processor 901 determines, from the at least one piece of authentication information, first authentication information corresponding to the public key identifier of the CI includes:

when the at least one piece of authentication information includes authentication information corresponding to the public key identifier of the CI, the processor 901 uses the authentication information corresponding to the public key identifier of the CI as the first authentication information.

In a possible embodiment, at least one piece of authentication information is pre-provisioned in at least one of the installed application installation package and the primary platform of the terminal.

In a possible embodiment, that the processor 901 determines, from the at least one piece of authentication information, first authentication information corresponding to the public key identifier of the CI includes:

when at least one piece of authentication information is pre-provisioned in the installed application installation package, and the at least one piece of authentication information includes the authentication information corresponding to the public key identifier of the CI, the processor 901 uses the authentication information as the first authentication information.

In a possible embodiment, that the processor 901 determines, from the at least one piece of authentication information, first authentication information corresponding to the public key identifier of the CI includes:

when the at least one piece of authentication information is pre-provisioned in the installed application installation package, and the at least one piece of authentication information does not include the authentication information corresponding to the public key identifier of the CI, the processor 901 uses at least one piece of authentication information pre-provisioned in the primary platform as the first authentication information.

In a possible embodiment, when the at least one piece of authentication information is not pre-provisioned in the installed application installation package, the processor 901 uses the at least one piece of authentication information pre-provisioned in the primary platform as the first authentication information. In an embodiment, when the to-be-downloaded data is an application installation package, the identifier of the to-be-downloaded data is an identifier of the application installation package.

Optionally, when the to-be-downloaded data is an APP, the identifier of the to-be-downloaded data is an identifier of the APP, and the information about the to-be-downloaded data further includes an identifier of an application installation package of the to-be-downloaded APP; and that the processor 901 determines a first networking profile based on the identifier of the to-be-downloaded data includes:

when the application installation package corresponding to the identifier of the application installation package is installed in the terminal, and no available first networking profile exists in the application installation package of the APP, the processor 901 determines the first networking profile based on the identifier of the to-be-downloaded data. In an embodiment, when the to-be-downloaded data is the APP, the identifier of the to-be-downloaded data is the identifier of the APP, and the information about the to-be-downloaded data further includes the identifier of the application installation package of the APP;

when the application installation package corresponding to the identifier of the application installation package is not installed in the terminal, that the transmitter 902 sends a first message to a server includes:

the transmitter 902 sends the first message to the server, where the first message includes the identifier of the application installation package of the APP;

that the receiver 903 receives a second message sent by the server, where the second message includes data corresponding to the identifier of the to-be-downloaded data, includes:

the receiver 903 receives the second message sent by the server, where the second message includes data corresponding to the identifier of the application installation package of the APP, and the receiver 903 installs the data in the primary platform of the terminal;

the transmitter 902 sends a third message to the server, where the third message includes the identifier of the APP; and the receiver 903 receives a fourth message sent by the server, where the fourth message includes data corresponding to the identifier of the APP.

In an embodiment, when the to-be-downloaded data is the APP, the identifier of the to-be-downloaded data is the identifier of the APP, and the information about the to-be-downloaded data further includes the identifier of the application installation package of the APP;

when the application installation package corresponding to the identifier of the application installation package is not installed in the terminal, that the transmitter 902 sends a first message to a server includes:

the transmitter 902 sends the first message to the server, where the first message includes the identifier of the application installation package of the APP and the identifier of the APP; and that the receiver 903 receives a second message sent by the server, where the second message includes data corresponding to the identifier of the to-be-downloaded data, includes:

the receiver 903 receives the second message sent by the server, where the second message includes the application installation package corresponding to the identifier of the application installation package of the APP and the APP corresponding to the identifier of the APP. Optionally, in this embodiment of this application, the terminal may further include a memory 904, where the memory is configured to store data, for example, the preconfigured at least one networking profile.

For implementations and beneficial effects of the components of the terminal in resolving problems in the foregoing embodiment, refer to implementations and beneficial effects of the methods shown in FIG. 8A, FIG. 8B, FIG. 9A, and FIG. 9B. Details are not described again herein.

Figure 16:
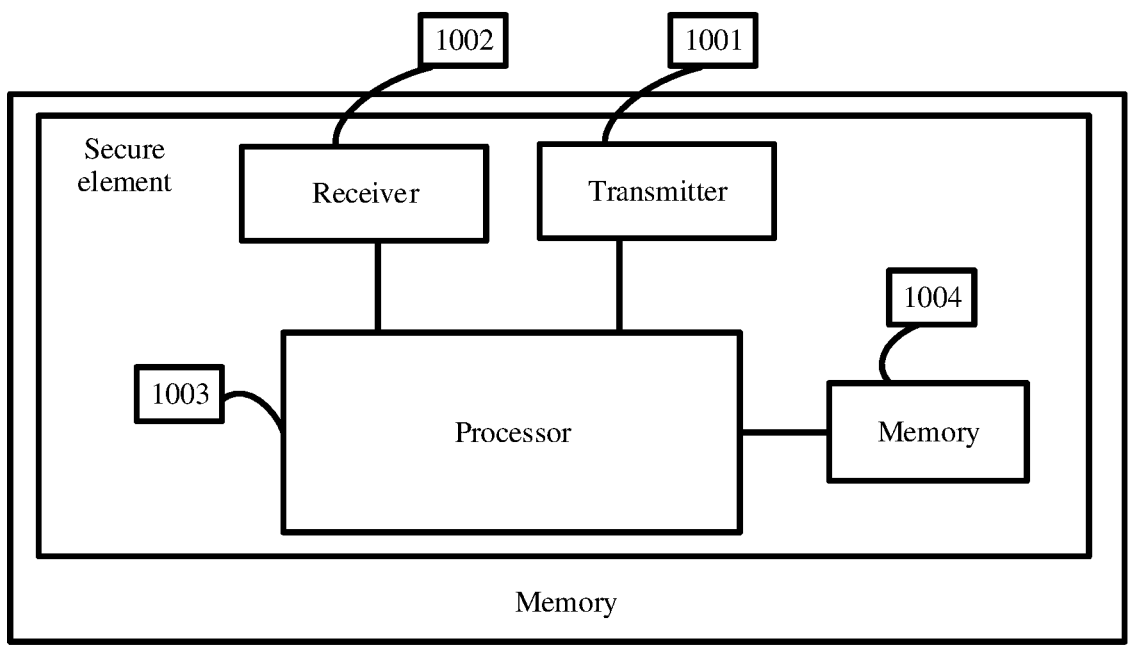
FIG. 16 is a schematic structural diagram of a secure element according to an embodiment of this application.
Figure 17:
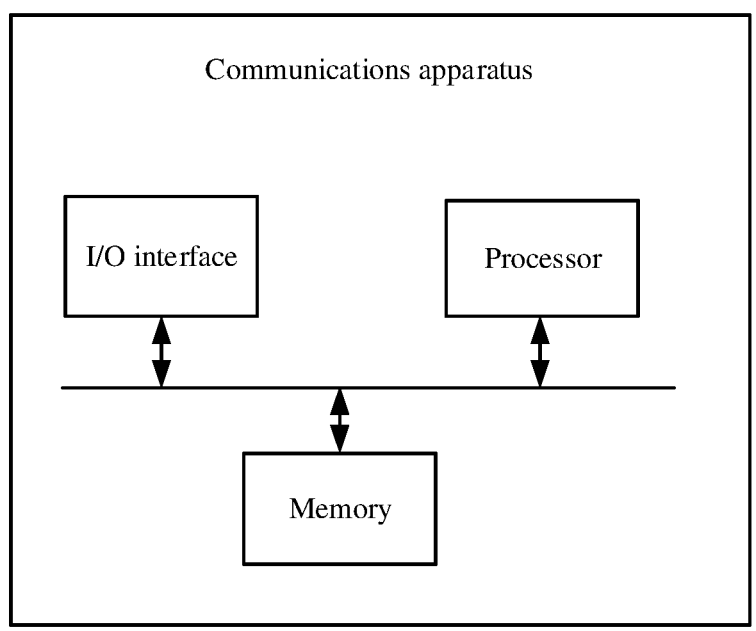
FIG. 17 is a schematic structural diagram of a communications apparatus according to an embodiment of this application.

FIG. 16 is a schematic structural diagram of a secure element according to an embodiment of this application. As shown in FIG. 16, the secure element may include:

a transmitter 1001, configured to send a preconfigured at least one networking profile to a management apparatus of a terminal, where the at least one networking profile is used by the management apparatus for networking, and obtaining data based on information obtained by the management apparatus about to-be-downloaded data, where the data corresponds to an identifier of the to-be-downloaded data that is included in the information about the to-be-downloaded data;

a receiver 1002, configured to receive the data sent by the management apparatus; and a processor 1003, configured to install the data.

In a possible implementation, at least one networking profile is pre-provisioned in at least one of an installed application installation package or a primary platform of the secure element.

Optionally, in this embodiment of this application, the terminal may further include a memory 1004, where the memory is configured to store data, for example, the pre-configured at least one networking profile.

An embodiment of this application further provides a management apparatus. As shown in FIG. 15, the management apparatus includes a receiver 803, configured to receive an operation instruction, where the operation instruction includes a deletion instruction, a deactivation instruction, or a switch instruction, the operation instruction includes an identifier of a first application installation package or an identifier of a first networking profile, and the operation instruction is used to manage the first application installation package or the first networking profile installed in a terminal; and a processor 801, configured to determine whether a second networking profile used for networking exists in the terminal after the operation instruction is executed, where when the second networking profile used for networking exists in the terminal, the processor 801 executes the operation instruction and activates the second networking profile.

In an embodiment, a transmitter 802 is further configured to send an activation request to a second application installation package of a second profile, where the activation request is used to activate the second networking profile in the second application installation package; or a transmitter 802 is further configured to send an activation request to a primary platform of the terminal, where the activation request is used to activate a second networking profile in the primary platform.

In an embodiment, the processor 801 is further configured to generate first prompt information, where the first prompt information is information about the second networking profile used for networking after the operation instruction is executed.

In an embodiment, when the second networking profile used for networking does not exist in the terminal after the operation instruction is executed, the processor 801 uses the first networking profile for networking, and downloads and installs the second networking profile; and when the downloading and installation of the second networking profile are complete, the processor 802 executes the operation instruction.

In an embodiment, the processor 801 is further configured to generate second prompt information, where the second prompt information is information for downloading and installing the second networking profile by using the first profile before the operation instruction is executed.

In an embodiment, the processor 801 is further configured to determine whether the operation instruction can be executed.

In an embodiment, that the receiver 803 receives an operation instruction includes:

the receiver 803 receives an operation instruction entered by a user; or in another embodiment, that the receiver 803 receives an operation instruction includes: the receiver 803 receives an operation instruction sent by a server.

In an embodiment, the processor 801 is further configured to obtain first information in the terminal, where the first information includes the installed first application installation package and first networking profile.

Optionally, in an embodiment, the second networking profile is pre-provisioned in the second application installation package installed in the terminal or the second networking profile is pre-provisioned in the primary platform of the terminal.

An embodiment of this application further provides a communications apparatus. The communications apparatus includes a processor and a memory.

The memory is configured to store a program instruction.

The processor is configured to execute the program instruction stored in the memory, so that the device separately performs the methods performed by the terminal and the management apparatus in FIG. 3 to FIG. 10. For brevity, details are not described again herein.

An embodiment of this application further provides a computer storage medium. The computer storage medium is configured to store a program. When the program is executed, the methods performed by the terminal and the management apparatus in FIG. 3 to FIG. 10 are separately implemented. For brevity, details are not described again herein.

An embodiment of this application further provides a computer program or a computer program product. The computer program or the computer program product includes an instruction. When the instruction is executed, the methods performed by the terminal and the management apparatus in FIG. 3 to FIG. 10 are separately implemented. For brevity, details are not described again herein.

All or some of the foregoing embodiments of the present invention may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data downloading method, wherein the data downloading method comprises:
    obtaining first information pre-provisioned in the terminal, wherein the first information comprises at least one networking profile and at least one piece of authentication information, and wherein the at least one networking profile is pre-provisioned in at least one of an installed application installation package and a primary platform including hardware components in a terminal;
    obtaining second information about to-be-downloaded data, wherein the second information comprises an identifier for the to-be-downloaded data and authentication information, wherein the to-be-downloaded data is a to-be-installed application installation package or a to-be-installed application (APP);
    selecting, according to the to-be-installed application installation package or the to-be-installed APP and from the pre-provisioned at least one networking profile in at least one of the installed application installation package and the primary platform, a first networking profile designated for downloading the to-be-installed application installation package or the to-be-installed APP, wherein the first networking profile is directed to a server and allows networking between the terminal and the server, and wherein the first networking profile is pre-provisioned in the terminal and associated with the to-be-installed application installation package or the to-be-installed APP;
    connecting to the server using the first networking profile is directed;
    performing, using the at least one piece of authentication information, two-way authentication between the terminal and the server before downloading the to-be-downloaded data;
    sending a first message to the server, wherein the first message comprises the identifier; and
    receiving a second message from the server, wherein the second message comprises data corresponding to the identifier.

2. The data downloading method of claim 1, wherein the first networking profile is required for downloading the data.

3. The data downloading method of claim 1, wherein the at least one networking profile is pre-provisioned in at least one of an installed application installation package or a primary platform of the terminal.

4. The data downloading method of claim 1, wherein the at least one networking profile is pre-provisioned in an installed application installation package, and wherein the first networking profile is required for downloading the data.

5. The data downloading method of claim 1, wherein the at least one networking profile is pre-provisioned in an installed application installation package, and wherein the first networking profile is not required for downloading the data.

6. The data downloading method of claim 1, wherein the at least one networking profile is not pre-provisioned in an installed application installation package.

7. The data downloading method of claim 1, wherein the second information further comprises a public key identifier of a certificate issuer (CI).

8. The data downloading method of claim 7, further comprising determining first authentication information corresponding to the public key identifier of the CI from the at least one piece of authentication information, wherein the first authentication information provides the two-way authentication between the terminal and the server.

9. The data downloading method of claim 7, wherein the at least one piece of authentication information is pre-provisioned in at least one of an installed application installation package.

10. The data downloading method of claim 7, wherein the at least one piece of authentication information is pre-provisioned in a primary platform of the terminal.

11. A terminal comprising:
    a processor; and
    a memory coupled to the processor and configured to store instructions that, when executed by the processor, cause the terminal to be configured to:
        obtain first information pre-provisioned in the terminal, wherein the first information comprises at least one networking profile and at least one piece of authentication information, and wherein the at least one networking profile is pre-provisioned in at least one of an installed application installation package and a primary platform including hardware components in the terminal;
        obtain second information about to-be-downloaded data, wherein the second information comprises an identifier for the to-be-downloaded data and authentication information, wherein the to-be-downloaded data is a to-be-installed application installation package or a to-be-installed application (APP);
        select, according to the to-be-installed application installation package or the to-be-installed APP and from the pre-provisioned at least one networking profile in at least one of the installed application installation package and the primary platform, a first networking profile designated for downloading the to-be-installed application installation package or the to-be-installed APP, wherein the first networking profile is directed to a server and allows networking between the terminal and the server, and wherein the first networking profile is pre-provisioned in the terminal and associated with the to-be-installed application installation package or the to-be-installed APP;
        connect to the server using the first networking profile;
        perform, using the at least one piece of authentication information, two-way authentication between the terminal and the server before downloading the to-be-downloaded data;
        send a first message to the server, wherein the first message comprises the identifier; and
        receive a second message from the server, wherein the second message comprises data corresponding to the identifier.

12. The terminal of claim 11, wherein the second information further comprises a public key identifier of a certificate issuer (CI).

13. The terminal of claim 12, wherein the instructions further cause the terminal to be configured to determine first authentication information corresponding to the public key identifier of the CI from the at least one piece of authentication information, and wherein the first authentication information provides the two-way authentication between the terminal and the server.

14. The terminal of claim 12, wherein the at least one piece of authentication information is pre-provisioned in at least one of an installed application installation package or a primary platform of the terminal.

15. The terminal of claim 11, wherein the instructions further cause the terminal to be configured to obtain the to-be-downloaded data using a captured quick response code.

16. The terminal of claim 11, wherein the instructions further cause the terminal to be configured to obtain the to-be-downloaded data by receiving information entered by a user.

17. The terminal of claim 11, wherein the instructions further cause the terminal to be configured to obtain the to-be-downloaded data by receiving an instruction of a user for selecting the to-be-downloaded data from a local list.

18. The terminal of claim 11, wherein the instructions further cause the terminal to be configured to obtain the to-be-downloaded data by receiving a tap of a user on a uniform resource locator (URL).

19. The terminal of claim 11, wherein the instructions further cause the terminal to be configured to obtain the to-be-downloaded data by receiving an instruction of a user for starting an APP.

20. A computer program product comprising computer-executable instructions for storage on a non-transitory computer-readable medium that, when executed by a processor:
    obtain first information pre-provisioned in the terminal, wherein the first information comprises at least one networking profile and at least one piece of authentication information, and wherein the at least one networking profile is pre-provisioned in at least one of an installed application installation package and a primary platform including hardware components in the terminal;
    obtain second information about to-be-downloaded data, wherein the second information comprises an identifier for the to-be-downloaded data and authentication information, wherein the to-be-downloaded data is a to-be-installed application installation package or a to-be-installed application (APP);
    select, according to the to-be-installed application installation package or the to-be-installed APP and from the pre-provisioned at least one networking profile in at least one of the installed application installation package and the primary platform, a first networking profile designated for downloading the to-be-installed application installation package or the to-be-installed APP, wherein the first networking profile is directed to a server and allows networking between the terminal and the server, and wherein the first networking profile is pre-provisioned in the terminal and the associated with to-be-installed application installation package or the to-be-installed APP;
    connect to the server using the first networking profile;
    perform, using the at least one piece of authentication information, two-way authentication between the terminal and the server before downloading the to-be-downloaded data;
    send a first message to the server, wherein the first message comprises the identifier; and
    receive a second message from the server, wherein the second message comprises data corresponding to the identifier.

* * * * *

UNITED STATES PATENT AND TRADEMARK OFFICE
CERTIFICATE OF CORRECTION

PATENT NO. : 11,832,348 B2
APPLICATION NO. : 17/054039
DATED : November 28, 2023
INVENTOR(S) : Shunan Fan, Xiaobo Yu and Shuiping Long It is certified that error appears in the above-identified patent and that said Letters Patent is hereby corrected as shown below:

In the Claims

Claim 1, Column 43, Lines 33-34: "networking profile is directed;" should read "networking profile;"

Signed and Sealed this
Ninth Day of January, 2024

Katherine Kelly Vidal
*Director of the United States Patent and Trademark Office*